(12) United States Patent
Sato et al.

(10) Patent No.: US 8,090,764 B2
(45) Date of Patent: Jan. 3, 2012

(54) COMMUNICATION SYSTEM, COMMUNICATION APPARATUS, COMMUNICATION METHOD, STORAGE MEDIUM, AND PACKAGE MEDIUM

(75) Inventors: Takashi Sato, Tokyo (JP); Katsuyuki Kanetsuna, Saitama (JP); Mitsuru Toriyama, Chiba (JP); Kaoru Kijima, Tokyo (JP)

(73) Assignee: Sony Corporation, Tokyo (JP)

( * ) Notice: Subject to any disclaimer, the term of this patent is extended or adjusted under 35 U.S.C. 154(b) by 2032 days.

(21) Appl. No.: 10/209,178

(22) Filed: Jul. 31, 2002

(65) Prior Publication Data

US 2003/0041123 A1 Feb. 27, 2003

(30) Foreign Application Priority Data

Jul. 31, 2001 (JP) .............................. P2001-232742

(51) Int. Cl.
*G06F 15/16* (2006.01)
(52) U.S. Cl. .................... 709/203; 709/217; 709/229
(58) Field of Classification Search .................. None
See application file for complete search history.

(56) References Cited

U.S. PATENT DOCUMENTS

| | | | |
|---|---|---|---|
| 4,346,442 A | 8/1982 | Musmanno | |
| 5,481,720 A | 1/1996 | Loucks et al. | |
| 5,625,810 A * | 4/1997 | Kurosu et al. | ............ 1/1 |
| 5,644,727 A | 7/1997 | Atkins | |
| 5,745,706 A | 4/1998 | Wolfberg et al. | |
| 5,787,427 A | 7/1998 | Benantar et al. | |
| 5,826,243 A | 10/1998 | Musmanno et al. | |
| 5,893,078 A | 4/1999 | Paulson | |
| 5,940,809 A | 8/1999 | Musmanno et al. | |
| 6,012,048 A | 1/2000 | Gustin et al. | |
| 6,018,722 A | 1/2000 | Ray et al. | |
| 6,058,378 A | 5/2000 | Clark et al. | |
| 6,108,641 A | 8/2000 | Kenna et al. | |
| 6,108,788 A | 8/2000 | Moses et al. | |
| 6,199,077 B1 | 3/2001 | Inala et al. | |
| 6,226,623 B1 | 5/2001 | Schein et al. | |
| 6,317,783 B1 | 11/2001 | Freishtat et al. | |
| 6,321,334 B1 | 11/2001 | Jerger et al. | |
| 6,324,523 B1 | 11/2001 | Killeen, Jr. et al. | |
| 6,324,691 B1 * | 11/2001 | Gazdik | ............ 717/178 |
| 6,405,245 B1 | 6/2002 | Burson et al. | |

(Continued)

FOREIGN PATENT DOCUMENTS

GB 2392262 2/2004

(Continued)

OTHER PUBLICATIONS

Dartmouth Research & Consulting Glossaries, 2000 (pp. 1-9).

(Continued)

*Primary Examiner* — Michael Y Won
*Assistant Examiner* — Van Kim T Nguyen
(74) *Attorney, Agent, or Firm* — Wolf, Greenfield & Sacks, P.C.

(57) ABSTRACT

A communication system is disclosed which includes: a storing element for storing content data corresponding to an image associated with a distributed storage medium; a retrieving element for retrieving address information on a network from the distributed storage medium; an accessing element for accessing the storing element based on the address information retrieved by the retrieving element; and a recording element for recording to the distributed storage medium the content data acquired by the accessing element from the storing element.

10 Claims, 12 Drawing Sheets

U.S. PATENT DOCUMENTS

| | | | |
|---|---|---|---|
| 6,412,073 B1 | 6/2002 | Rangan | |
| 6,453,420 B1 * | 9/2002 | Collart | 726/26 |
| 6,473,800 B1 | 10/2002 | Jerger et al. | |
| 6,510,451 B2 | 1/2003 | Wu et al. | |
| 6,513,019 B2 | 1/2003 | Lewis | |
| 6,526,438 B1 * | 2/2003 | Bienvenu et al. | 709/219 |
| 6,529,949 B1 * | 3/2003 | Getsin et al. | 709/217 |
| 6,567,850 B1 | 5/2003 | Freishtat et al. | |
| 6,594,766 B2 | 7/2003 | Rangan et al. | |
| 6,598,028 B1 | 7/2003 | Sullivan et al. | |
| 6,606,606 B2 | 8/2003 | Starr | |
| 6,633,910 B1 | 10/2003 | Rajan | |
| 6,675,382 B1 * | 1/2004 | Foster | 717/177 |
| 6,721,716 B1 | 4/2004 | Gross | |
| 6,763,370 B1 * | 7/2004 | Schmeidler et al. | 709/203 |
| 6,766,363 B1 * | 7/2004 | Rothschild | 709/219 |
| 6,802,042 B2 | 10/2004 | Rangan et al. | |
| 6,834,346 B1 * | 12/2004 | Ishibashi et al. | 713/179 |
| 6,845,908 B2 * | 1/2005 | Morita et al. | 235/382 |
| 6,868,403 B1 * | 3/2005 | Wiser et al. | 705/51 |
| 6,901,378 B1 * | 5/2005 | Linker et al. | 705/27 |
| 6,944,621 B1 * | 9/2005 | Collart | 707/102 |
| 6,952,775 B1 * | 10/2005 | Miura | 713/182 |
| 6,970,849 B1 * | 11/2005 | DeMello et al. | 705/52 |
| 7,000,242 B1 * | 2/2006 | Haber | 725/43 |
| 7,031,939 B1 | 4/2006 | Gallagher | |
| 7,054,937 B1 * | 5/2006 | Milne et al. | 709/227 |
| 7,095,871 B2 * | 8/2006 | Jones et al. | 382/100 |
| 7,191,153 B1 * | 3/2007 | Braitberg et al. | 705/51 |
| 7,212,728 B2 * | 5/2007 | Shirakawa | 386/70 |
| 7,228,342 B2 * | 6/2007 | Chatani | 709/219 |
| 7,337,147 B2 * | 2/2008 | Chen et al. | 705/59 |
| 7,437,430 B2 * | 10/2008 | Rhoads | 709/219 |
| 2002/0010768 A1 | 1/2002 | Marks et al. | |
| 2002/0038299 A1 * | 3/2002 | Zernik et al. | 707/3 |
| 2002/0165801 A1 * | 11/2002 | Stern et al. | 705/27 |
| 2003/0002671 A1 * | 1/2003 | Inchalik et al. | 380/202 |
| 2003/0014268 A1 * | 1/2003 | Tobin et al. | 705/1 |
| 2004/0049420 A1 * | 3/2004 | Carlson et al. | 705/14 |
| 2005/0243585 A1 * | 11/2005 | Marchant et al. | 365/45 |
| 2006/0015450 A1 | 1/2006 | Guck et al. | |

FOREIGN PATENT DOCUMENTS

| | | |
|---|---|---|
| JP | 10149404 A | 6/1998 |
| JP | 11-250633 A | 9/1999 |
| JP | 2001-060286 A | 3/2001 |
| WO | WO 97-19406 | 5/1997 |
| WO | WO 01/15164 A1 | 3/2001 |
| WO | WO 01-88674 A2 | 11/2001 |

OTHER PUBLICATIONS

Bruce Schneier, Applied Cryptography, Second Edition, Protocols, Algorithms, and Source Code in C, pp. 30-32.

U.S. Appl. No. 10/210,183, filed Aug. 1, 2002, Tanaka Izuru.

U.S. Appl. No. 10/269,832, filed Oct. 11, 2002, Takashi Kawakami et al.

* cited by examiner

COMMUNICATION SYSTEM, COMMUNICATION APPARATUS, COMMUNICATION METHOD, STORAGE MEDIUM, AND PACKAGE MEDIUM

BACKGROUND OF THE INVENTION

The present invention relates to a communication system, a communication apparatus, a communication method, and a storage medium whereby content data are downloaded over a network and recorded to a package medium.

Today, one way of marketing content data is to have them recorded on read-only optical discs such as compact discs. These optical discs are each housed in a package and offered to users as package media by vendors. Distribution of content data using the package media serves two major purposes: the vendors can sell the content data, and the users who bought them in the form of physical packages can satisfy their possessive instinct, i.e., their desire to own tangible entities.

Another way of distributing content data involves allowing the data to be transferred over a network. In this case, users can record the distributed content data to a recordable optical disc or magneto-optical disc. The method is very convenient from the vendors' point of view because there is no need to handle package media physically; the data need only be transmitted directly to users over the network. Another advantage of this method is that the most recent data can be easily offered to users by transmission over the network.

Some disadvantages of the network-based data distribution do exist. For example, users must take steps to search for and gain access to a website from which to download the content data of interest. Even where the address of the website in question is known to users beforehand, the users still need to enter the address information through a keyboard or like devices, which can be a chore. Once the website is accessed, it can be a wearisome and time-consuming task to search through numerous uploaded content data items for a desired one. Another disadvantage of the network-based data distribution is that the scheme fails to satisfy users' possessive instinct because content data are transmitted to the users' terminals over the network as an intangible entity and not in any physical form.

A further disadvantage is the fear of possible abuses of personal information being transferred. When downloading content data, the user need to settle payments by entering such sensitive information as credit card numbers and passwords in addition to their names and addresses for transmission to a server that offers the data distribution service. Any information exchanged over the network could be tapped by an unscrupulous third party having illegally accessed the network. Under the circumstances, the users have reason to be uneasy about making payments over the network.

SUMMARY OF THE INVENTION

It is therefore an object of the present invention to overcome the above and other deficiencies of the conventional art and to provide a communication system, a communication apparatus, a communication method, and a storage medium for addressing stimulatingly two kinds of market: one on which content data are marketed in the form of package media, and another on which content data are distributed over the network.

It is another object of the present invention to provide a communication system, a communication apparatus, a communication method, and a storage medium for letting users purchase blank media beforehand so that content data downloaded by the users may be recorded to the purchased media, thereby satisfying the users' desire to possess a physical entity while eliminating the need for the users to transfer personal information over the network to settle payments.

In carrying out the invention and according to one aspect thereof, there is provided a communication system including: a storing element for storing content data corresponding to an image associated with a distributed storage medium; a retrieving element for retrieving address information on a network from the distributed storage medium; an accessing element for accessing the storing element based on the address information retrieved by the retrieving element; and a recording element for recording to the distributed storage medium the content data acquired by the accessing element from the storing element.

According to another aspect of the invention, there is provided a communication method including the steps of: causing a storing element to store content data corresponding to an image associated with a distributed storage medium; causing a retrieving element to retrieve address information on a network from the distributed storage medium; causing an accessing element to access the storing element based on the retrieved address information; and recording to the distributed storage medium the content data acquired by the accessing element from the storing element.

According to a further aspect of the invention, there is provided a communication apparatus including: a storing element for storing content data corresponding to an image associated with a distributed storage medium; a receiving element for receiving an access request from a second communication apparatus; a searching element for searching through the storing element for stored content data in accordance with the access request; and a transmitting element for transmitting to the second communication apparatus the content data searched for and retrieved by the searching element.

According to an even further aspect of the invention, there is provided a communication method including the steps of: causing a storing element to store content data corresponding to an image associated with a distributed storage medium; causing a receiving element to receive an access request from a second communication apparatus; causing a searching element to search through the storing element for stored content data in accordance with the access request; and causing a transmitting element to transmit to the second communication apparatus the content data searched for and retrieved by the searching element.

According to a still further aspect of the invention, there is provided a communication apparatus including: a retrieving element for retrieving network address information from a distributed storage medium to which content data are to be recorded; a transmitting element for transmitting an access request to a second communication apparatus which stores content data corresponding to an image associated with the distributed storage medium; a receiving element for receiving content data sent from the second communication apparatus in response to the access request; and a recording element for recording to the distributed storage medium the content data received by the receiving element.

According to a yet further aspect of the invention, there is provided a communication method including the steps of: causing a retrieving element to retrieve network address information from a distributed storage medium to which content data are to be recorded; causing a transmitting element to transmit an access request to a second communication apparatus which stores content data corresponding to an image associated with the distributed storage medium; causing a receiving element to receive content data sent from the second communication apparatus in response to the access request; and causing a recording element to record to the distributed storage medium the content data received by the receiving element.

According to another aspect of the invention, there is provided a storage medium which stores a computer program executable by a computer, the computer program including the steps of: causing a retrieving element to retrieve address information on a network from a distributed storage medium; causing an accessing element to access a storing element of a second computer based on the address information retrieved by the retrieving element and to receive content data from the storing element of the second computer, the content data corresponding to an image associated with the distributed storage medium; and causing a recording element to record to the distributed storage medium the content data received by the accessing element.

In a typical setup according to the invention, a user purchases a blank storage medium at a price covering the content data to be subsequently recorded thereon. The storage medium thus purchased is loaded into the user's communication apparatus. In turn, the communication apparatus retrieves address information from the loaded medium (typically an optical disc) and gains access to a storage facility designated by the address information, downloads from the storage facility the content data corresponding to an image associated with the storage medium in question, and records the downloaded data to the medium.

In other words, users visiting record shops or like establishments may look at jackets, photos and other images associated with relevant storage media, before purchasing a specific storage medium to which desired content data are to be recorded following download. Although users at this point settle payments in advance for the content data yet to be acquired, they feel secure in making their purchases over the counter without recourse to accessing the network. The storage medium has address information (i.e., URL) recorded thereon, so that suitable retrieving means may automatically read the URL from the medium to let appropriate accessing means access accordingly a website from which to download the content data. There is no need for users to enter address information through their terminals. Because users can ultimately possess package media retaining the content data, the users' desire to own tangible entities is satisfied.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENTS

A content distribution system embodying the invention will now be described by referring to the accompanying drawings.

Figure 1:
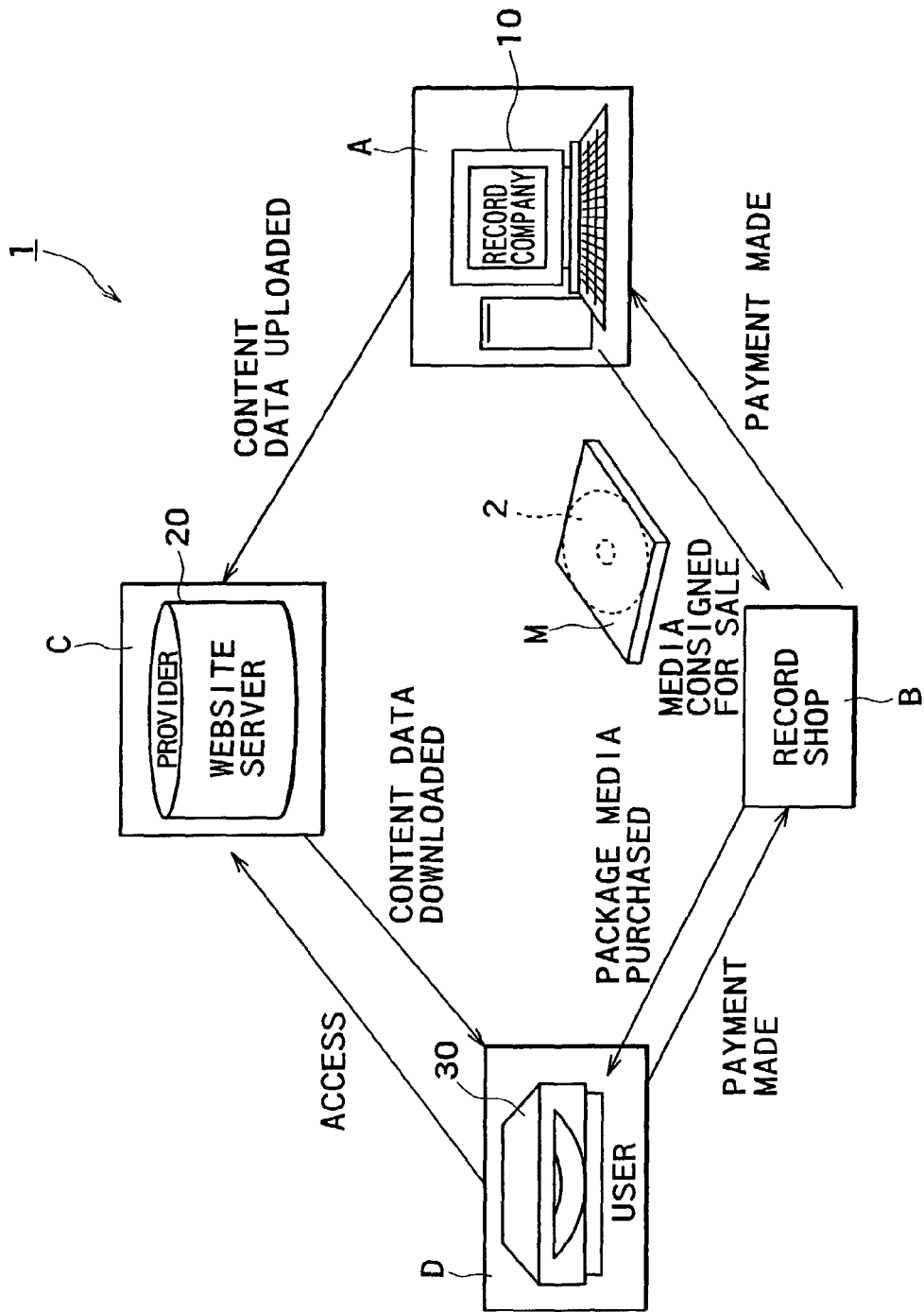
FIG. 1 is a schematic view outlining a content distribution system embodying the invention.

As shown in FIG. 1, this content distribution system 1 includes a record company A, a record shop B, and a provider C. The record company A creates content data such as music data and movie data, and produces package media M on which these content data are recorded. The record shop B sells the package media M. The provider C distributes the content data over a network. A user D taking part in the content distribution system 1 may purchase at the record shop B an optical disc 2 constituting a package medium M, and may record to that disc desired content data downloaded from a server 20 managed by the provider C.

The record company A creates such content data as music data, movie data and game software. The content data thus created are uploaded from a terminal 10 of the record company A to the server 20 of the provider C. The record company A produces the package media M each composed of a suitably packaged optical disc 2 to which desired content data downloaded from the server 20 may be recorded by a user terminal 30 set up by the user D. Such package media M are consigned to the record shops B to be marketed.

Each package medium M is constituted by the optical disc 2 such as a CD-R(trademark), a CD-RW(trademark), a DVD-R(trademark), a DVD-RW(trademark), or a Blu-ray Disc (trademark) wrapped in an appropriate package. The package medium M is designed to accommodate content data that the user D may download from a particular website through the user terminal 30. The optical disc 2 contains address information in addition to a storage area for recording downloaded content data. The address information provides the address of a website from which to download the content data in question. The website is initially accessed when the user D who purchased the package medium M loads the medium into the user terminal 30. The package medium M contains a jacket bearing photos and comments about the content data to be recorded to the optical disc 2. Obviously, what is printed on the jacket may be also recorded beforehand on the optical disc 2 for subsequent display on a display unit of the user terminal 30.

The price of the package medium M sold at the record shop B is arranged to cover copyright royalties and usage fees for the content data to be recorded onto the optical disc 2. When buying the package medium M at the record shop B, the user D thus makes advance payment for the future use of the content data although the medium is blank at that point. This means that the system 1 allows the user D to settle payments over the counter at the record shop. Without recourse to data transfer over the network, the user D feels secure making purchases of desired content data.

Figure 2:
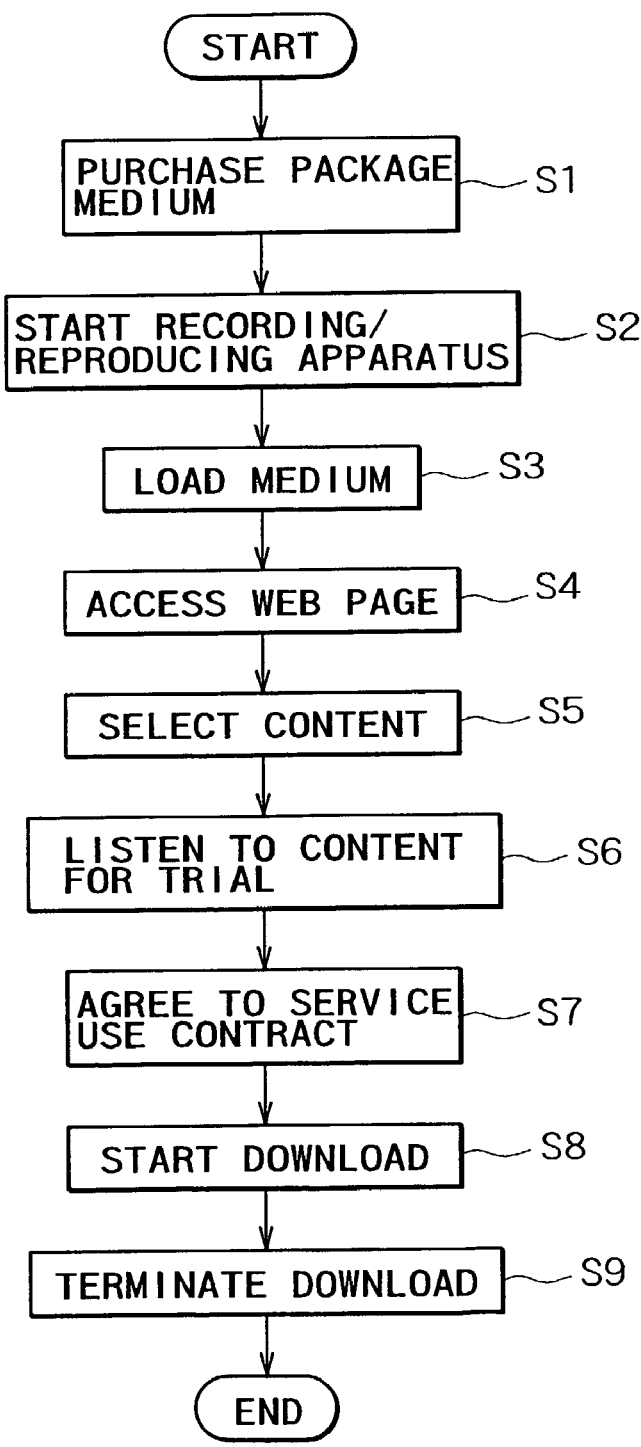
FIG. 2 is a flowchart of steps performed by a user in operating the system from the time the user purchases a package medium until desired content data are downloaded and recorded to the medium.

After buying the package medium M at the record shop B, the user D can download the relevant content data from the server 20 managed by the provider C, as indicated in FIG. 2. FIG. 2 shows a series of steps performed by a user from the time a package medium is purchased until desired content data are downloaded. In step S1, the user D purchases the package medium M at the record shop B. In step S2, the user D starts up the user terminal 30 and loads the optical disc 2 constituting the package medium M into a loading unit of the terminal.

With the optical disc 2 loaded by the user D into the user terminal 30, step S4 is reached. In step S4, the user terminal 30 retrieves address information from the loaded disc and gains access over the network to the server 20 that supports a website designated by the address. This illustratively causes a web page to appear on a display unit of the user terminal 30. The web page shows a list of downloadable content data items. In step S5, the user D selects a desired content data item from the downloadable content data list.

In step S6, the user D listens to part of the currently selected content data item for trial. If the trial is satisfactory, the user D clicks on, say, a SELECT button on the display unit to finalize the choice. In step S7, the display unit of the user terminal 30 displays a service use contract with this system 1. When the user D agrees to the contract, step S8 is reached in which the user terminal 30 starts downloading the content data selected by the user D. In step S9, the user terminal 30 terminates the data download and records the downloaded content data to the optical disc 2 loaded in the loading unit of the terminal.

As described, the system 1 allows the user D who bought the package medium M to download desired content data from the server for recording onto the medium. In such a case, the user terminal 30 retrieves a URL (i.e., address information) of the relevant website from the optical disc 2 for automatic access to the server 20, thereby sparing the user the chore of searching for the necessary web page. Whereas it takes time conventionally to produce package media carrying an artist's latest songs to be marketed, this system can initiate the distribution service by simply uploading the relevant content data to the provider C. The user D can obtain the latest hits or other desired pieces of music from the provider C long before the package medium M carrying the music are sold over the counter. The inventive system also makes it possible for the user D to make an original optical disc 2 containing his or her favorite songs that have been downloaded. Also, the record company A may upload the content data of out-of-print albums to the provider C, allowing the user D to download desired out-of-print songs. Furthermore, the user D may produce an optical disc 2 commemorating special occasions such as someone's birthday, wedding anniversary, by downloading content data associated with the event and recording the downloaded content onto the disc 2 to be offered as a gift.

In the above-described content distribution system 1, the terminal 10 of the record company A, the server 20 of the provider C running the system 1, and the user terminal 30 owned by the user D are interconnected via such networks as ISDN (Integrated Services Digital Network), CATV (Cable Television) networks, optical cable networks, or satellite links. Data exchanges between these terminals are carried out in accordance with suitable transmission protocols such as TCP/IP (Transmission Control Protocol/Internet Protocol) and FTP (File Transfer Protocol).

Figure 3:
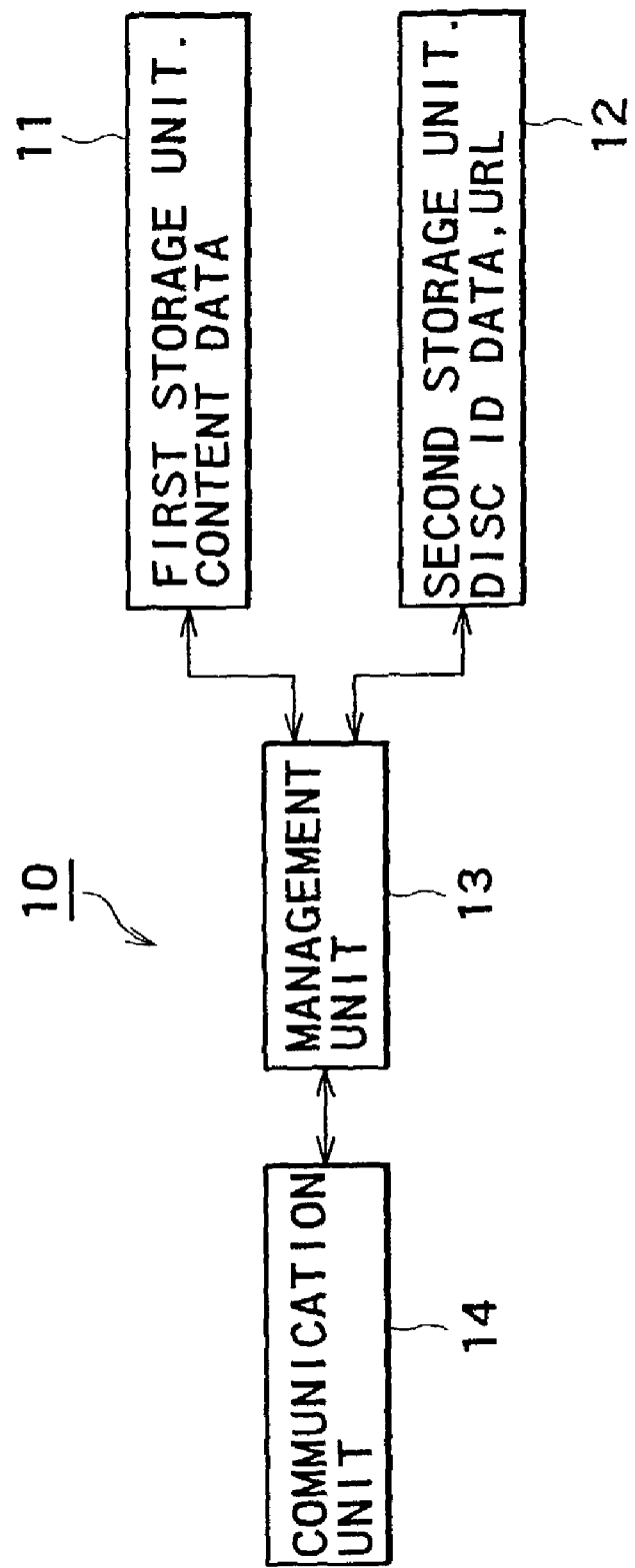
FIG. 3 is a schematic view showing a typical structure of terminal equipment at a record company.

The terminal 10 owned by the record company A, shown in FIG. 3, has basically the same structure as ordinary personal computers. The record company's terminal 10 illustratively includes: a first storage unit 11 that stores content data such as music data created by artists under contract with the company; a second storage unit 12 that stores address information and the like to be accessed with a view to downloading content data and recording the downloaded data to the optical disc 2 of the package medium A; a management unit 13 that manages data held in the first storage unit 11 and second storage unit 12; and a communication unit 14 that uploads content data and address information, to the server 20.

The first and second storage units 11 and 12 are each constituted by a mass-storage hard disc drive. The first storage unit 11 contains a plurality of content data items to be uploaded to the server 20. Illustratively, the data items to be uploaded include the currently marketed albums of artists under contract with the record company A, out-of-print albums, pieces of music yet to be marketed as "single" CDs but made available online, current hits, and rearranged oldies.

The second storage unit 12 accommodates disc ID data by which to identify package media M sold at the record shop B. The disc ID data recorded in advance on the optical disc 2 are used to verify whether the package medium M in question is a legitimate one marketed by the record company A. The disc ID data also serve to specify the genre and type, of the content data that may be recorded to the optical disc 2. More specifically, the disc ID data of a given package medium M may specify that the optical disc 2 is allowed to record hit songs from a specific time period, content data associated with a specific occasion such as Christmas, and/or songs or an album of a particular artist.

The second storage unit 12 retains address information, that is URL (Uniform Resource Location), about websites at the server 20 from which to download content data. For example, if the record company A sells a package medium M to which hit songs from a particular time period may be downloaded and recorded, the second storage unit 12 stores the URL of a specific web page from which these hit songs may be downloaded. If the record company A sells a package medium M to which Christmas songs may be downloaded and recorded, the second storage unit 12 stores the URL of another web page from which Christmas songs may be downloaded. If the record company A markets a package medium M to which an album of a specific artist may be downloaded and recorded, the second storage unit 12 retains the URL of yet another web page from which the album in question may be downloaded.

When an operator of the record company A selects some content data items held in the first storage unit 11 to designate their upload to the server 20, the management unit 13 retrieves the content data items in question from the first storage unit 11 and transmits the applicable data to the server 20 through the communication unit 14. At the same time, the management unit 13 retrieves from the second storage unit 12 the disc ID data and URL of a package medium M to which the uploaded content data may be recorded, and sends the retrieved ID data and URL to the server 20 via the communication unit 14. In turn, the server 20 sets up a web page with the applicable URL from which the content data uploaded from the record company's terminal 10 may be downloaded.

As mentioned above, the package media M marketed by the record company A are each constituted by an optical disc 2 such as a CD-R, a CD-RW, a DVD-R, a DVD-RW, or a Blu-ray Disc wrapped in an appropriate package. The package contains a jacket printed photos and comments about the content data to be recorded to the optical disc 2. What is printed on the jacket may be also recorded in advance on the optical disc 2 for subsequent display on the display unit of the user terminal 30.

Figure 4:
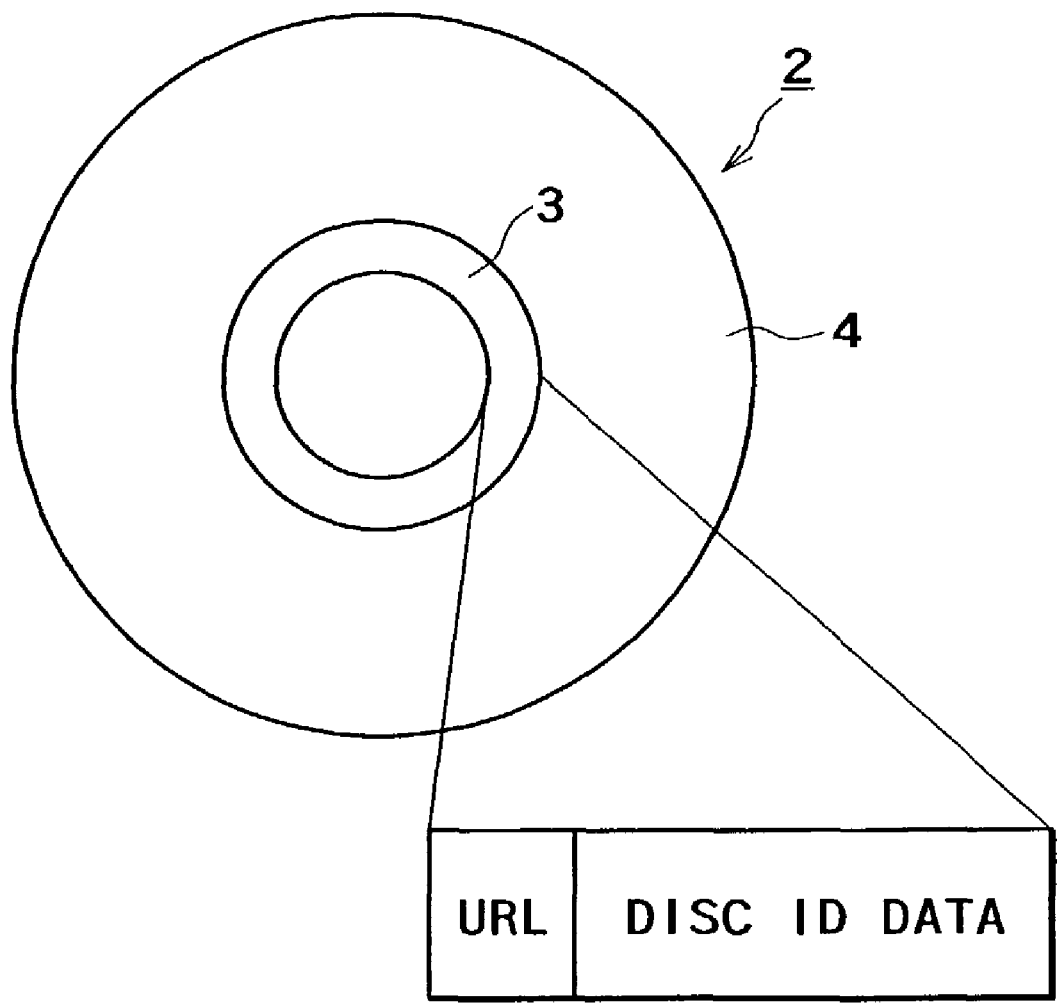
FIG. 4 is a schematic view depicting a typical structure of an optical disc.

A typical structure of the optical disc 2 is described below by referring to FIG. 4. The optical disc 2 illustratively includes a read-only area 3 on the innermost side (i.e., lead-in side) of the disc. A recording area 4 is provided in radially outside relation to the read-only area 3. The read-only area 3 retains the URL and disc ID data discussed above. The read-only area 3 also contains image data that are associated with the content data recordable to the recording area 4 and that are read out when the user D loads the optical disc 2 into the user terminal 30. According to the invention, the image data may also be utilized as disc ID data. The recording area 4 located radially outside the read-only area 3 is an area that accommodates the content data to be downloaded from the server 20 by the user terminal 30.

With the read-only area 3 allocated on the lead-in side to accommodate a URL and disc ID data, loading of the optical disc 2 by the user D into the user terminal 30 causes the URL and disc ID data, to be retrieved on the spot. At this point, the optical disc 2 causes the user terminal 30 to access the URL-designated location and prompts the terminal 30 or the server 20 to verify whether the loaded disc is a legitimate disc.

Taking a look at what is printed on the jacket contained in the package along with the optical disc 2 allows the user D at the storefront of the record shop B to judge which content data may be recorded to the optical disc 2. Looking at the jacket enables the user D to see that the optical disc 2 can accommodate, say, big hits in July 2001, songs by artist X, Christmas songs, or songs released in July 2001.

Figure 5:
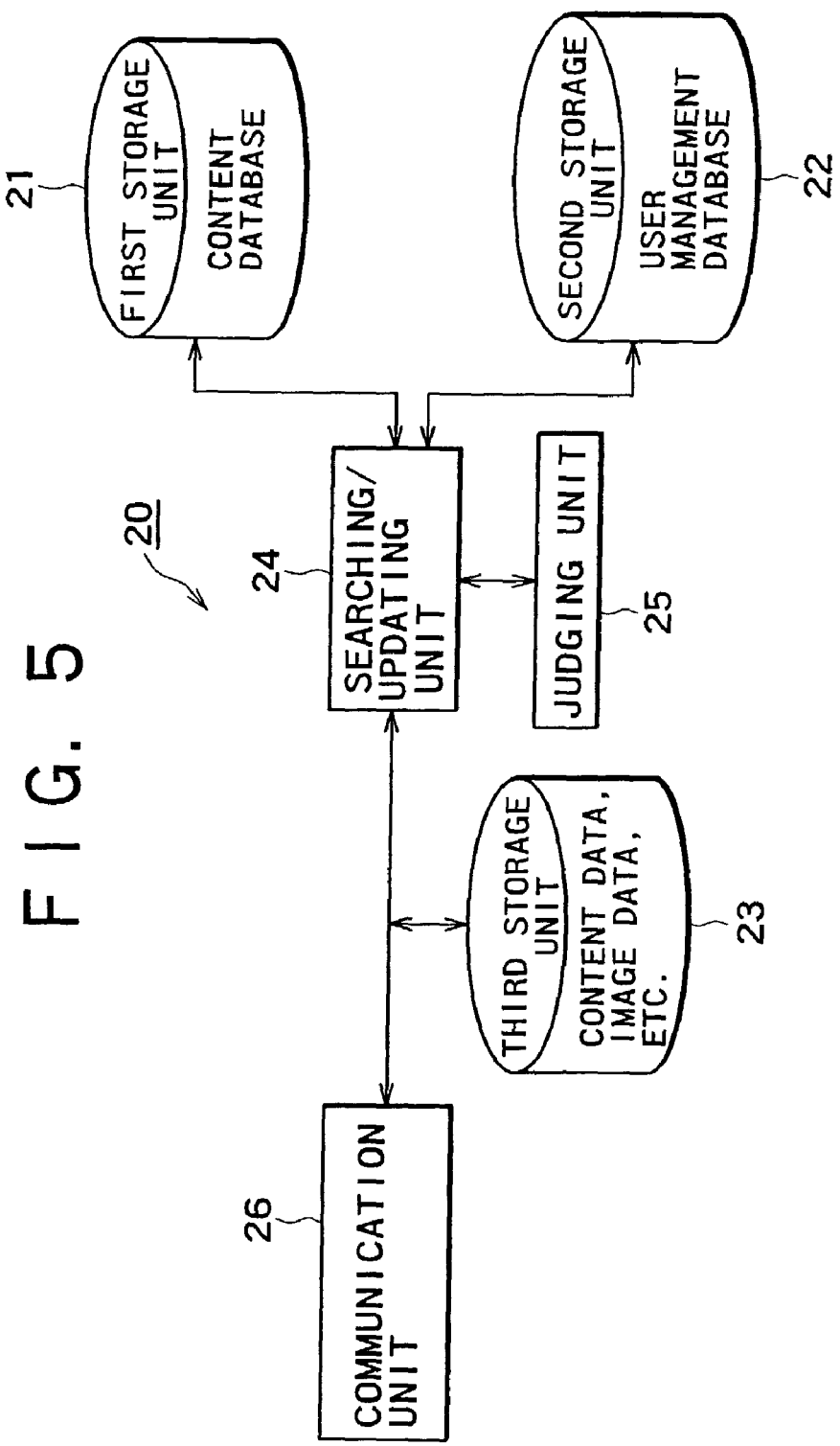
FIG. 5 is a schematic view indicating a typical structure of a server.

A typical structure of the server 20 managed by the provider C running this system 1 is outlined below by referring to FIG. 5. The server 20 has basically the same structure as ordinary personal computers. The server 20 illustratively includes: a first storage unit 21 that accommodates a content database for managing content data sent from the record company's terminal 10; a second storage unit 22 that retains a user management database for managing the users D downloading content data; a third storage unit 23 that holds data constituting web pages; a searching/updating unit 24 that searches through the databases in the first and second storage units 21 and 22 and updates their contents as needed; a judging unit 25 that judges whether the user D accessing the server 20 has a legitimately purchased package medium M; and a communication unit 26 for communicating with the record company's terminal 10 and user terminal 30.

The first, second and third storage units 21, 22 and 23 are each constituted illustratively by a mass-storage hard disc drive. The first storage unit 21 has the content database for managing the content data uploaded from the record company's terminal 10. The content data is typically structured as shown in Table 1 below.

TABLE 1

| Genres (Titles) | Disc ID Data | Content ID Data | URL |
|---|---|---|---|
| Big Hits in July 2001 | A0001 | aaa bbb ccc . . . | abc.co.jp |
| Songs by Artist X | B0001 | ddd eee fff . . . | def.co.jp |
| Christmas Songs | C0001 | ggg hhh iii . . . | ghi.co.jp |
| Songs | D0001 | jjj | jkl.co.jp |

TABLE 1-continued

| Genres (Titles) | Disc ID Data | Content ID Data | URL |
|---|---|---|---|
| Released in July 2001 | | kkk lll . . . | |
| PPP | E0001 | mmm | opq.co.jp |
| QQQ | F0001 | nnn | rst.co.jp |
| RRR | G0001 | ooo | xyz.co.jp |
| . . . | . . . | . . . | . . . |

The content database has a plurality of genres (i.e., titles) associated with relevant disc ID data items. Each genre (title) is also assigned content ID data indicating the content data items included in the genre in question. For example, the genre "Big hits in July 2001" is associated with a disc ID data item "A0001" and with content ID data "aaa," "bbb," "ccc," etc.; the genre "Songs by artist X" is associated with a disc ID data item "B0001" and with content ID data "ddd," "eee," "fff," etc.; the genre "Christmas songs" is associated with a disc ID data item "C0001" and with content ID data "ggg," "hhh," "iii," etc.; the genre "Songs released in July 2001" is associated with a disc ID data item "D0001" and with content ID data "jjj," "kkk," "lll," etc.

In the content database, each disc ID data item is related to a content ID data item. Illustratively, a title "PPP" is related to a disc ID data item "E0001" and to a content ID data item "mmm"; a title "QQQ" is related to a disc ID data item "F0001" and to a content ID data item "nnn"; and a title "RRR" is related to a disc ID data item "G0001" and to a content ID data item "ooo."

In the content database, each disc ID data item is assigned a URL designating the web page to be accessed when the content data corresponding to the disc ID data item in question are to be downloaded.

As described, the content database is designed to restrict access to the content data that may be downloaded by each user D in accordance with the disc ID data held on the optical disc 2 of the package medium M purchased by the user D.

The second storage unit 22 has the user management database for managing users who gain access to the server 20 to download content data therefrom. The user management database is structured illustratively as shown in Table 2 below.

TABLE 2

| User Name | Disc ID Data | Genres | No. of Remaining Songs | Remaining Download Period |
|---|---|---|---|---|
| abc | A0001 | Big Hits in July 2001 | 2/10 | |
| def | B0002 | Songs by Artist X | | 3 Days |
| ghi | C0001 | Christmas Songs | 11/11 | |
| jkl | D0002 | Songs Released in July 2001 | | 1 Day |

In the user management database, each user's name is associated with the disc ID data from the disc owned by the user D in question, with the genre designated by the disc ID data, with the number of remaining downloadable songs according to the disc ID data, and with the remaining download period specified by the disc ID data. For example, the database indicates that a user "abc" owns an optical data 2 with the disc ID data "A0001," has so far downloaded eight of the ten downloadable songs in the genre called "Big hits in July 2001," and is entitled to download two more songs. Another user "def" is shown possessing an optical disc 2 with the disc ID data "B0002" and entitled to download the "Songs by artist X" in the next three days. Another user "ghi," the database indicates, owns an optical disc 2 with the disc ID data "C0001," has yet to download any of the "Christmas songs," and is entitled to download eleven songs that remain. Yet another user "jkl" is shown possessing an optical disc 2 with the disc ID data "D0002" and entitled to download the "Songs released in July 2001" during the next day.

The third storage unit 23 retains image data, audio data, which constitute the web pages, as well as content data in association with the content ID data. The content data held in the third storage unit 23 may illustratively include content data revised after their release over the counter and albums containing more songs than those sold at the record shops B regardless of the same albums being marketed over the counter. That is, the content data retained in the third storage unit 23 may be those updated continuously over time.

In order to facilitate data transmission to the user terminal 30, the audio data held in the third storage unit 23 are compressed by such methods as ATRAC3 (Adaptive Transform Acoustic Coding 3; (trademark), MPEG-2AAC (Motion Picture Experts Group 2 Advanced Audio Coding; (trademark), MP3 (MPEG-1; Audio Layer 3; (trademark), TwinVQ (Transform-Domain Weighted Interleave Vector Quantization; (trademark), MS Audio (WMA: Windows Media Audio; (trademark), or Ogg Vorbis(trademark). The video data kept in the third storage unit 23 are compressed by methods such as MPEG-4 or MPEG-7 for the same purpose.

Generally, the masking effect of compression techniques makes compressed audio data lower in quality (albeit in a slight degree) than uncompressed audio data. This is one of the features of the system 1 for averting conflict with an existing content data market, i.e., one for read-only optical discs 2 such as CD-DAs carrying uncompressed audio data and marketed at the record shops B. The content data held in the third storage unit 23 may be "corrupted" intentionally in quality, not consequentially through compression. Conversely, the content data retained in the third storage unit 23 may be given higher quality and marketed at higher prices than those sold at the record shops B.

As another alternative, the content data accommodated in the third storage unit 23 may consist of uncompressed, ordinary PCM data. In this case, conflict with the market of CDs sold at the record shops B is avoided by offering different content data that are not sold over the counter.

The searching/updating unit 24 receives from the user terminal 30 selection data for selecting content data, and searches accordingly through the content database of the first storage unit 21 for the applicable content data. After transmitting the retrieved content data to the user terminal 30, the searching/updating unit 24 searches through the user management database of the second storage unit 22 for the corresponding user D and updates the database entries involved.

The judging unit 25 judges whether the user D attempting to download is authorized to do so. More specifically, the judging unit 25 determines whether the optical disc 2 loaded by the user D into the user terminal 30 is a legitimate disc based on the disc ID data sent from the terminal 30. The user ID upon check may indicate that the user D in question has downloaded all downloadable songs or that the valid download period assigned to the user has expired. If that is the case, the judging unit 25 inhibits the user D from downloading any more songs.

Figure 6:
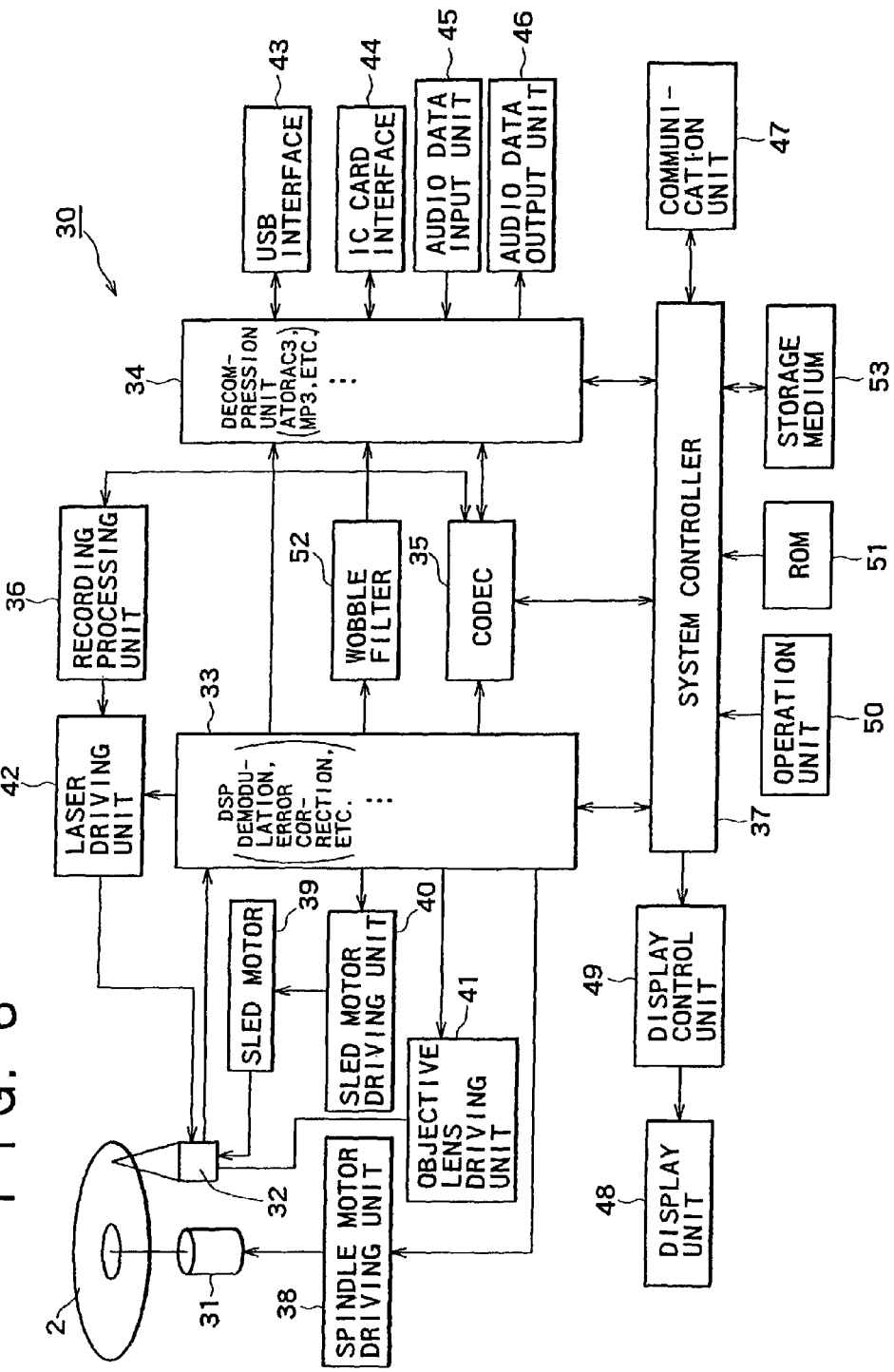
FIG. 6 is a schematic view sketching a typical structure of a user terminal.

How the user terminal 30 is typically structured will now be described. The terminal 30, set up at the user's household, is capable of both reproducing and recording content data; it reproduces data from read-only optical discs 2 such as CD-DAs, CD-ROMs and DVDs marketed traditionally at the record shops B and other establishments; and downloads content data from the server 20 before recording the downloaded data to a recordable optical disc 2. As shown in FIG. 6, the user terminal 30 includes: a spindle motor 31 for rotating the optical disc 2; an optical pickup 32 for emitting a light beam to the optical disc 2 and picking up the reflected beam; a DSP (Digital Signal Processor) 33 for reproducing data from a read-only optical disc 2 such as CD-DA; a decompression unit 34 for decompressing compressed data; a codec 35 that retrieves computer program data or the like from the read-only optical disc 2 such as CD-ROM, decodes the retrieved data, and encodes the data to be recorded to a recordable optical disc 2; a recording processing unit 36 for processing the data to be recorded to the recordable optical disc 2; and a system controller 37 for providing overall control.

The user terminal 30 further includes: a spindle motor driving unit 38 for driving the spindle motor 31; a sled motor 39 for feeding the optical pickup 32 in the radial direction over the optical disc 2; a sled motor driving unit 40 for driving the sled motor 39; an objective lens driving unit 41 to drive an objective lens driver incorporated in the optical pickup 32; and a laser driving unit 42 designed to drive a semiconductor laser emitting a light beam incorporated in the optical pickup 32.

The user terminal 30 also includes: a USB (Universal Serial Bus) interface 43 for exchanging data with other devices in keeping with USB standards; an IC card interface 44 for interfacing to an IC card containing a semiconductor memory as a storage device; an audio data input unit 45 for inputting audio data; an audio data output unit 46 for outputting audio data; a communication unit 47 for communicating data with the server 20; a display unit 48 for displaying web pages and the like; a display control unit 49 for controlling the display unit 48; an operation unit 50 through which to make playback and other operations and to enter characters and the like; and a memory 51 constituted illustratively by a ROM that retains a browser and other programs for gaining access to a URL retrieved from the optical disc 2.

The spindle motor 31 has its drive shaft furnished with a disc table. In operation, the spindle motor 31 rotates the optical disc 2 mounted in properly centered relation to the disc table. The spindle motor driving unit 38 that controls the spindle motor 31 in rotation drives the loaded optical disc 2 at CLV (Constant Linear Velocity), at CAV (Constant Angular Velocity), or using a suitable combination of the two settings.

The optical pickup 32 causes the objective lens to focus a light beam generated by a light source such as a semiconductor laser, emits the focused light beam onto the optical disc 2, and detects a reflected light beam from the disc surface using a photodetector, thereby retrieving recorded data from the optical disc 2 or writing data to recording tracks on the disc 2. The semiconductor laser generating the light beam is controlled by the laser driving unit 42. The laser driving unit 42 controls the semiconductor laser in such a manner that the light beam for recording operation is emitted at a higher level than for reproducing operation.

The objective lens is held by the objective lens driver that in turn is controlled by the objective lens driving unit 41. The objective lens driving unit 41 generates a focusing signal and a tracking signal in such a manner that the error signals will lead to zero in combination. The signals thus generated are output to the objective lens driver. Given the signals, the objective lens driver moves the objective lens in a focusing direction (i.e., along the optical axis of the lens) and in a tracking direction (i.e., perpendicularly to the optical axis of the lens) accordingly.

The optical pickup 32 is fed in the radial direction of the optical disc 2 by the sled motor 39. The sled motor 39 in rotation is controlled by the sled motor driving unit 40. As data are being recorded to or reproduced from the optical disc 2, the sled motor driving unit controls the sled motor 39 in such a manner that the optical pickup 32 is moved progressively from the radially inner side to the radially outer side of the disc.

The DSP 33 receives data read by the optical pickup 32. If the input data are audio data, the DSP 33 demodulates 8-14 or 8-16 modulated data coming from the optical pickup 32. The DSP 33 also carries out error handling based on CIRC (Cross Interleave Reed-Solomon Code) or RS-PC (Reed Solomon Product Code). Following the demodulation or error handling, the DSP 33 outputs the resulting data to the decompression unit 34. If the input data are computer programs or data to be processed by computers, the DSP 33 sends the data to the codec 35.

The decompression unit 34 decompresses compressed data and outputs the resulting data to the USB interface 43, IC card interface 44, or/and audio data output unit 46. More specifically, the decompression unit 34 decompresses the data that have been compressed by such methods as ATRAC3, MPEG-2AAC, MP3, TwinVQ, MS Audio, Ogg Vorbis, MPEG-4, or MPEG-7.

The codec 35 performs demodulation, error handling and other suitable processing on the input data and outputs the resulting data to the decompression unit 34. Before recording of data to the optical disc 2, the codec 35 subjects the input data to 8-14 or 8-16 modulation, error handling based on CIRC or RS-PC, interleave operation, or DSV (digital sum variation). The data thus treated are sent to the recording processing unit 36. The recording processing unit 36 subjects the received data to binarization or other recording-related processes required for recording data to the optical disc 2, and outputs the resulting data to the laser driving unit 42. Based on the input data, the laser driving unit 42 causes the semiconductor laser to emit a light beam.

The USB interface 43 exchanges data in wired relation with another device in accordance with USB standards. Connecting this interface with a USB interface of an external device enables the user terminal to send and receive data to and from that device. Alternatively, another interface such as an IEEE (Institute of Electrical and Electronics Engineers) 1394 interface may take the place of the USB interface. The IC card interface 44 accommodates an IC card. The IC card interface 44 allows data to read from the IC card loaded therein or to be recorded to the IC card. Audio data coming from another device may be input through the audio data input unit 45. The audio data output unit 46 is connected to an electro-acoustic transducer such as headphones and earphones, and outputs reproduced audio data to the connected transducer.

The communication unit 47 exchanges data with the server 20 over the network. Illustratively, the communication unit 47 gains access to the location indicated by the URL retrieved from the optical disc 2. Also, the communication unit 47 downloads content data from the server 20.

The display unit 48 is constituted by a CRT (Cathode Ray Tube), an LCD (Liquid Crystal Display) or the like and is controlled by the display control unit 49. Illustratively, the display unit 48 displays a program being reproduced from the optical disc 2 or a web page that has been accessed over the network. The operation unit 50 includes pushbuttons such as a play button, a recording start button, a stop button, and track jump buttons; a keyboard and numeric keys for inputting characters; a mouse for pointing to and designating a specific display or input position; and a joystick.

The system controller 37 provides overall control reflecting operation signals entered in response to the user D's operations performed on the operation unit 50. Illustratively, given operation signals from the operation unit 50, the system controller 37 controls the DSP 33, codec 35, and decompression unit 34 accordingly. When the optical disc 2 is loaded, the system controller 37 starts from the memory 51 (e.g., ROM) an application program constituting a browser for browsing web pages, and causes the communication unit 47 to access the location indicated by the URL retrieved from the optical disc 2. When the communication unit 47 downloads content data from the server 20, the system controller 37 forwards the downloaded content data to the codec 35 for an encoding process preparatory to recording data to the optical disc 2. Upon recording of the downloaded content data to the optical disc 2, the system controller 37 determines whether the optical disc 2 is a legitimate one. When the communication unit 47 accesses a particular web page and downloads image data and other data from that page, the system controller 37 causes the display control unit 49 to display the web page in question on the display unit 48. Furthermore, the system controller 37 causes the image data and other data retrieved from the optical disc 2 to appear on the display unit 48.

As an alternative, the user terminal 30 may be equipped with a wobble filter 52 through which to retrieve from the optical disc 2 the data recorded in wobbled fashion. Illustratively, if the data recorded on the optical disc 2 have a quantifying bit number of twenty, then low-order four bits for high sound quality may be recorded in wobbled fashion and the data may be extracted through the filter 52. If content data are encrypted and if a decryption key to decrypt the data is recorded in wobbled fashion, the decryption key may be extracted through the wobble filter 52.

Described below are steps carried out when the user D downloads content data from the server 20 through the user terminal 30, and records the downloaded content data to the optical disc 2 of the package medium M purchased at the record shop B.

Figure 7:
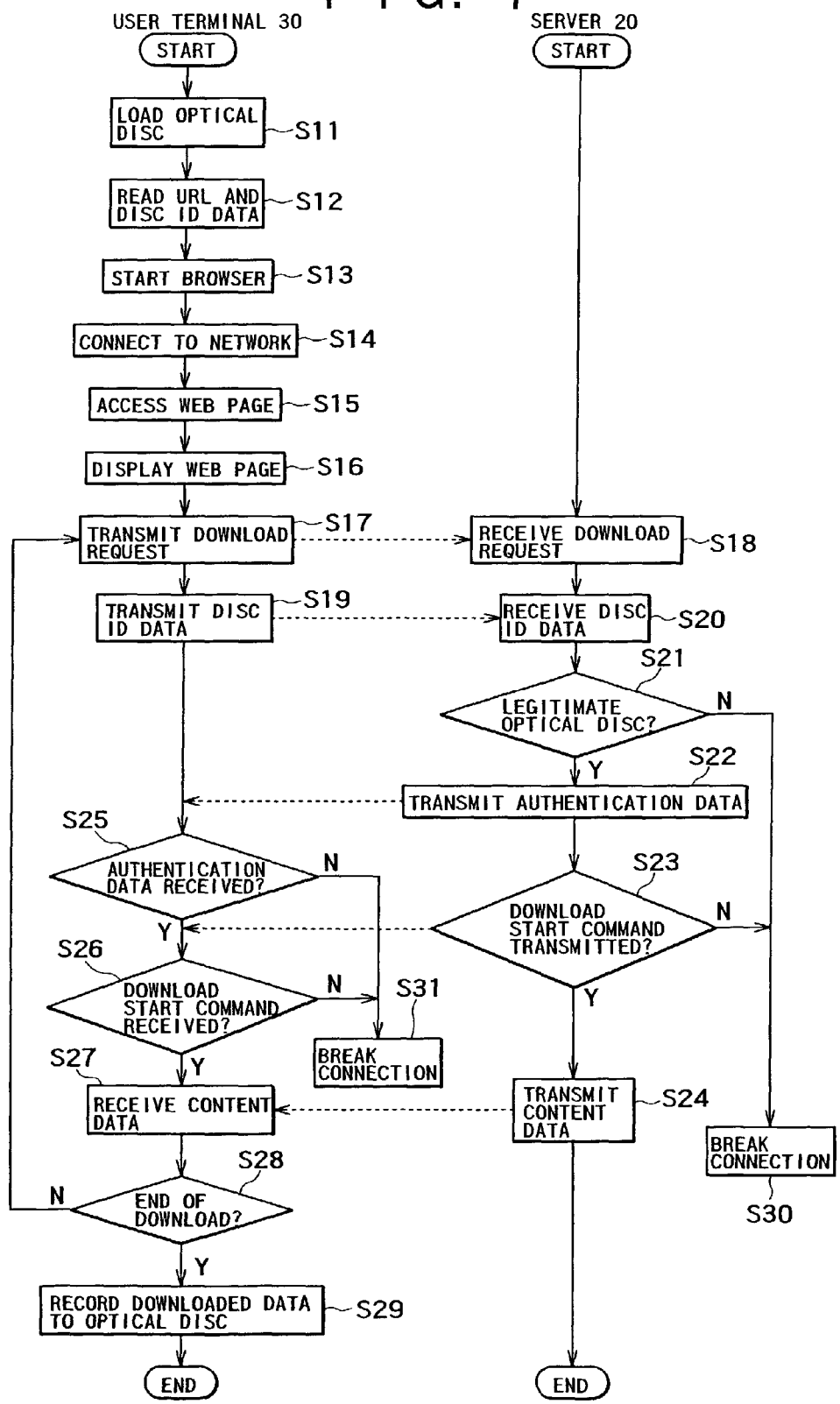
FIG. 7 is a flowchart of steps carried out by the user at the user terminal in getting desired content data downloaded from the server and recorded to a package medium (e.g., optical disc) purchased at a record shop, with the server authenticating the optical disc in question.

In step S11 of FIG. 7, the user D loads the optical disc 2 of the package medium M onto the disc table of the spindle motor 31. On detecting the optical disc 2 mounted on the disc table, the system controller 37 goes to step S12. In step S12, the system controller 37 provides overall control in such a manner as to start reading data from the innermost side of the disc 2. More specifically, the spindle motor driving unit 38 drives to rotate the loaded optical disc 2 at CLV or CAV the sled motor driving unit 40 drives the sled motor 39 to move the optical pickup 32 initially towards the innermost side of the optical disc 2 on the disc table. By getting the objective lens driving unit 41 to effect focusing and tracking control, the optical pickup 32 then emits the light beam to the read-only area 3 of the optical disc 2 and detects a reflected light beam from the disc surface. Detecting the reflected light beam permits retrieval of the URL and disc ID data from the read-only area 3. The DSP 33 reproduces the URL and disc ID data retrieved through the optical pickup 32, and outputs the reproduced data to the system controller 37.

In step S13, the system controller 37 starts the application program making up the browser from the memory 51. In step S14, the system controller 37 connects to a network such as the Internet through a dial-up connection or similar arrangements. In step S15, the browser causes the communication unit 47 to access the web page set up by the sever 20 and designated by the URL read from the optical disc 2. In step S16, the browser downloads from the server 20 the image data and other data constituting the accessed web page, and causes the display unit 48 to display the web page. The web page carries the titles of content data that may be downloaded onto the optical disc 2 owned by the user D, as well as a server use contract that needs to be agreed to before downloading.

In step S17, the user D agrees to the service use contract displayed on the display unit 48 and clicks on a download button, by use of a mouse or the like constituting part of the operation unit 50. In turn, the browser causes the communication unit 47 to transmit to the server 20 a download request for downloading content data. In step S18, the server 20 receives through the communication unit 26 (FIG. 5) the download request sent from the user terminal 30.

In step S19, the browser on the user terminal 30 causes the communication unit 47 to transmit to the server 20 the disc ID data retrieved from the optical disc 2 set on the disc table. In step S20, the server 20 receives through the communication unit 26 the disc ID data sent from the user terminal 30.

In step S21, the judging unit 25 of the server 20 judges whether the optical disc 2 to which the user D is about to record content data is a legitimate disc. More specifically, the judging unit 25 determines whether the disc ID data sent from the user terminal 30 are registered in the content database set up in the first storage unit 21 as shown in Table 1 above. If in step S21 the judging unit 25 judges the optical disc 2 to be legitimate, the server 20 goes to step S22 and transmits authentication data to the user terminal 30 through the communication unit 26. If instep S21 the judging unit 25 finds that the optical disc 2 is not a legitimate one, then the server 20 transmits rejection data to the user terminal 30 through the communication unit 26 and reaches step S30 to break the connection. In step S23, the server 20 transmits a download start command to the user terminal 30 through the communication unit 26. If the server 20 can send the download start command to the user terminal 30, step S24 is reached; if the server 20 cannot transmit the download start command, then step S30 is reached where the connection is severed.

In step S24, the searching/updating unit 24 of the server 20 searches for the content ID data associated with the disc ID data sent from the user terminal 30. The searching/updating unit 24 then searches through the third storage unit 23 for the content data associated with the content ID data. With the applicable content data retrieved from the third storage unit 23, the communication unit 26 transmits the retrieved data to the user terminal 30.

For example, if the disc ID data sent from the user terminal 30 indicate "A0001" as shown in Table 1 above, the content data associated with the content ID data "aaa," "bbb," "ccc," etc., are retrieved and transmitted consecutively to the user terminal 30 through the communication unit 26.

Meanwhile, in step S25, the browser on the user terminal 30 checks to see if the authentication data from the server 20 have been received by the communication unit 47. If the authentication data are judged received, step S26 is reached. If the authentication data are not judged received and rejection data are received instead, then step S31 is reached in which the connection with the server 20 is broken.

In step S26, the browser on the user terminal 30 determines whether the download start command is received from the server 20. If the download start command is judged received, step S27 is reached in which the browser starts downloading the content data. Specifically, the content data transferred from the server 20 are recorded onto a storage medium 53 composed of a hard disc drive, a mass-storage memory or the like. If the download start command is not judged received, then the browser reaches step S31 to break the connection.

In step S28, the browser checks to see if download of the content data has come to an end. When the download is judged terminated, step S29 is reached. If the download has yet to be completed, step S17 is reached again.

When download of the content data is terminated, step S29 is reached in which the downloaded content data are recorded to the optical disc 2. More specifically, the browser outputs to the codec 35 the content data downloaded onto the storage medium 53. The codec 35 modulates the input content data from the system controller 37 by a predetermined modulation method and supplements the data with error-correcting code before outputting the resulting data to the recording processing unit 36. The recording processing unit 36 carries out necessary recording-related processes such as binarization preparatory to recording the content data to the optical disc 2. The sled motor driving unit 40 moves the optical pickup 32 to the recording area 4 on the optical disc 2. The laser driving unit 42 causes the semiconductor laser to emit a high-power light beam to record the content data. On the optical disc 2, phase change materials constituting a recording layer of the recording area 4 are changed in phase and pigments in the recording layer are decomposed under the laser beam, whereby the data are recorded.

In the example above, as described, the user D purchases at the record shop B a package medium M containing a blank optical disc 2 to which to record desired content data at a later date. The user D feels at ease making a payment over the counter at the record shop B; there is no need to settle the payment online over the network. Because the user D has no need to go through bothersome online payment procedures upon downloading of content data, the content data can be downloaded smoothly from the server 20. In this case, authentication of the optical disc 2 is performed by the server 20, so that the work load on the user terminal 30 is alleviated.

When purchasing package media M, the user D can look at their jackets to find out which content data are allowed to be recorded to the optical disc 2. Even if package media M with optical discs 2 carrying content data are sold at the record shops B, the user D may still download the latest version or modifications of the content data in question from the server 20. For example, the user D may download seasonally rearranged or otherwise modified content data from the server 20.

In the setup above, the server 20 was described as judging whether the optical disc 2 to which the user D is about to record content data is a legitimate disc. Alternatively, the judgment may be made on the side of the user terminal 30, as described below.

Figure 8:
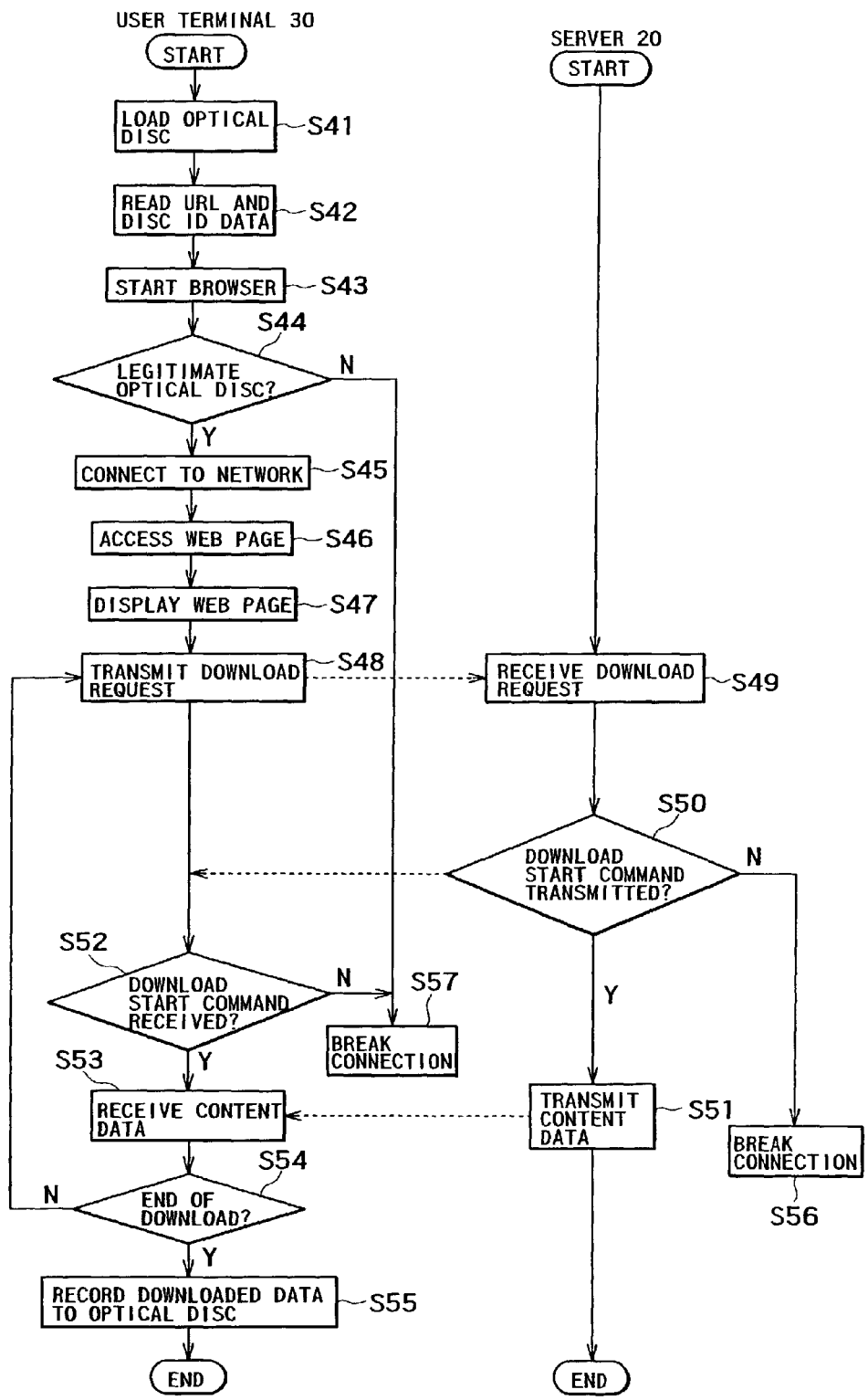
FIG. 8 is a flowchart of steps executed by the user terminal for optical disc authentication.

In step S41 of FIG. 8, the user D loads the optical disc 2 of the package medium M onto the disc table of the spindle motor 31. On detecting the optical disc 2 mounted on the disc table, the system controller 37 goes to step S42. In step S42, the system controller 37 starts reading data (i.e., URL and disc ID data) from the innermost side of the disc. In step S43, the system controller 37 starts the application program making up the browser from the memory 51 to gain access to the web page.

In step S44, the system controller 37 judges whether the loaded optical disc 2 is a legitimate one. Specifically, detecting the disc ID data allows the system controller 37 to determine that the optical disc 2 mounted on the disc table is a legitimate disc. With the optical disc 2 on the disc table judged legitimate, the system controller 37 goes to step S45. If the optical disc 2 is not judged legitimate, then the system controller 37 reaches step S57 to stop connecting to a network.

In step S45, the system controller 37 connects to a network such as the Internet through a dial-up connection or similar arrangements. In step S46, the browser causes the communication unit 47 to access the web page set up by the sever 20 and designated by the URL read from the optical disc 2. In step S47, the browser downloads from the server 20 the image data and other data constituting the accessed web page, and causes the display unit 48 to display the web page.

In step S48, the user D agrees to the service use contract displayed on the display unit 48 and clicks on the download button, by use of the mouse or the like constituting part of the operation unit 50. In turn, the browser causes the communication unit 47 to transmit to the server 20 a download request for downloading content data together with disc ID data. In step S49, the server 20 receives through the communication unit 26 the download request and disc ID data sent from the user terminal 30.

In step S50, the server 20 transmits the download start command to the user terminal 30 through the communication unit 26. If the server 20 can send the download start command to the user terminal 30, step S51 is reached; if the server 20 cannot transmit the download start command, then step S56 is reached in which the connection is broken.

In step S51, the searching/updating unit 24 of the server 20 searches for the content ID data associated with the disc ID data sent from the user terminal 30. The searching/updating unit 24 then searches through the third storage unit 23 for the content data associated with the content ID data. With the applicable content data retrieved from the third storage unit 23, the communication unit 26 transmits the retrieved data to the user terminal 30.

For example, if the disc ID data sent from the user terminal 30 indicate "B0001" as shown in Table 1 above, the content data associated with the content ID data "ddd," "eee," "fff," etc., are retrieved and transmitted consecutively to the user terminal 30 through the communication unit 26.

In step S52, the browser on the user terminal 30 determines whether the download start command is received from the server 20. If the download start command is judged received, step S53 is reached in which the browser starts downloading the content data. Specifically, the content data transferred from the server 20 are recorded to the storage medium 53. If the download start command is not judged received, then the browser reaches step S57 to break the connection.

In step S54, the browser checks to see if download of the content data has come to an end. When the download is judged terminated, step S55 is reached. If the download has yet to be completed, step S48 is reached again.

When download of the content data is terminated, step S55 is reached in which the content data downloaded onto the storage medium 53 are recorded to the optical disc 2. Specifically, the browser outputs the downloaded content data to the codec 35. The codec 35 modulates the input content data from the system controller 37 by a predetermined modulation method and supplements the data with error-correcting code before outputting the resulting data to the recording processing unit 36. The recording processing unit 36 carries out necessary recording-related processes such as binarization preparatory to recording the content data to the optical disc 2. The sled motor driving unit 40 moves the optical pickup 32 to the recording area 4 on the optical disc 2. The laser driving unit 42 causes the semiconductor laser to emit a high-power light beam to record the content data. On the optical disc 2, the content data are recorded to the recording area 4.

In the case above, authentication of the optical disc 2 is performed by the user terminal 30. This alleviates the work load on the server 20.

In the examples above, the user terminal 30 was shown accessing the server 20 only after the optical disc 2 loaded into the terminal 30 is judged legitimate. However, this is not limitative of the invention. Alternatively, as described below, a check may be made to see whether a legitimate optical disc 2 is loaded into the user terminal 30 after the server 20 is accessed and before downloading of the content data is started.

Figure 9:
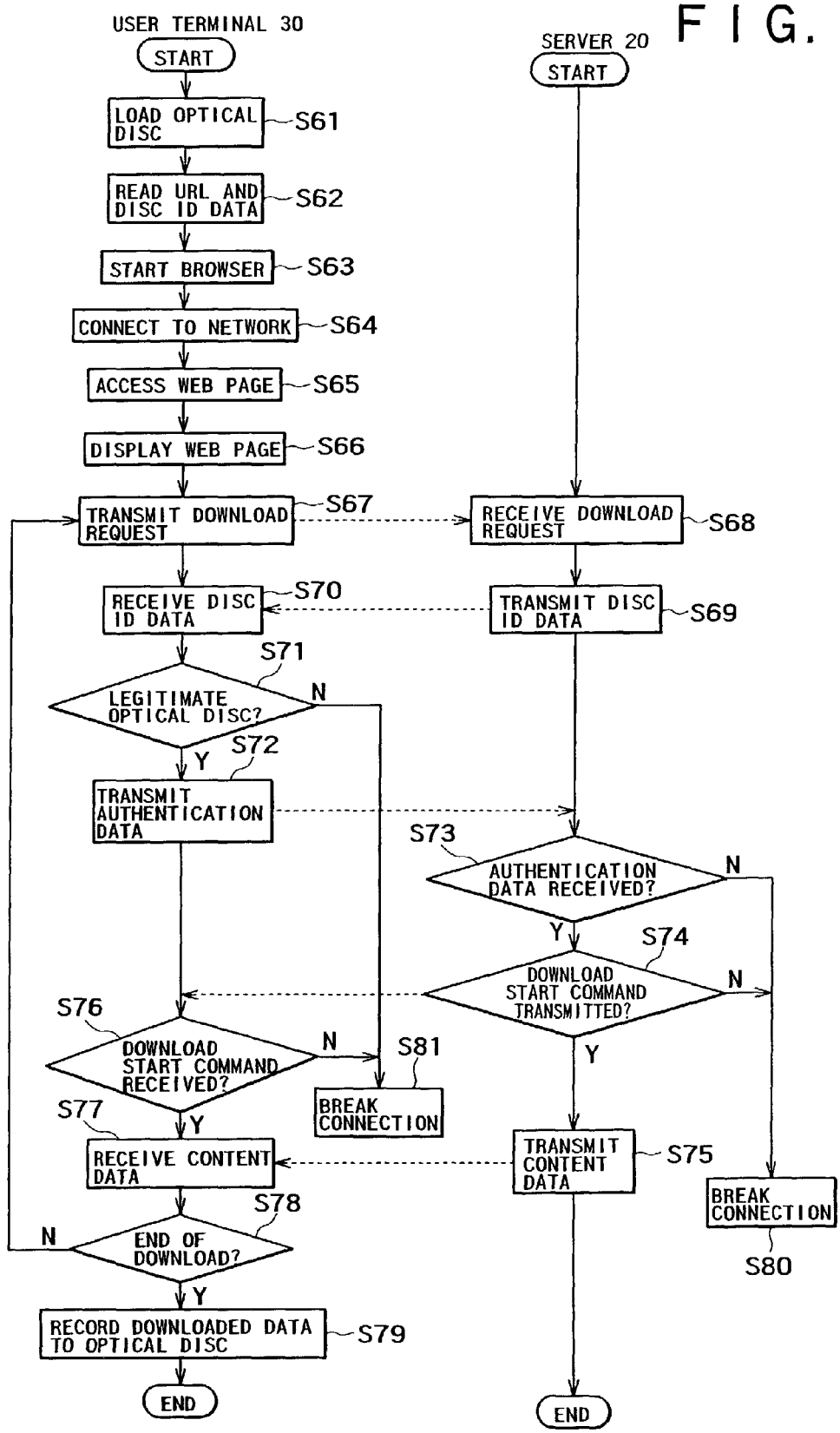
FIG. 9 is another flowchart of steps conducted by the user terminal for optical disc authentication.

In step S61 of FIG. 9, the user D loads the optical disc 2 of the package medium M onto the disc table of the spindle motor 31. On detecting the optical disc 2 mounted on the disc table, the system controller 37 goes to step S62. In step S62, the system controller 37 starts reading data (i.e., URL and disc ID data) from the innermost side of the disc. In step S63, the system controller 37 starts the application program making up the browser from the memory 51 to gain access to the web page.

In step S64, the system controller 37 connects to a network such as the Internet through a dial-up connection or similar arrangements. In step S65, the browser causes the communication unit 47 to access the web page set up by the sever 20 and designated by the URL read from the optical disc 2. In step S66, the browser downloads from the server 20 the image data and other data constituting the accessed web page, and causes the display unit 48 to display the web page.

In step S67, the user D agrees to the service use contract displayed on the display unit 48 and clicks on the download button, by use of the mouse or the like constituting part of the operation unit 50. In turn, the browser causes the communication unit 47 to transmit to the server 20 a download request for downloading content data. In step S68, the server 20 receives through the communication unit 26 the download request sent from the user terminal 30.

In step S69, the searching/updating unit 24 of the server 20 searches through the content database, set up in the first storage unit 21 and depicted in Table 1 above, for the disc ID data corresponding to the URL of the accessed web page. The corresponding disc ID data, when spotted, are retrieved from the content database. Also in step S69, the server 20 transmits the disc ID data to the user terminal 30 through the communication unit 26. In step S70, the user terminal 30 receives through the communication unit 47 the disc ID data sent from the server 20.

In step S71, the user terminal 30 judges whether the optical disc 2 to which the user D is about to record content data is a legitimate disc. More specifically, the system controller 37 determines whether the disc ID data sent from the optical disc 2 match the disc ID data coming from the server 20. In the event of a match, the system controller 37 goes to step S72. In step S72, the system controller 37 transmits authentication data on the optical disc 2 to the server 20 through the communication unit 47. In case of a disc ID data mismatch, the system controller 37 reaches step S81 to break the connection.

In step S73, the judging unit 25 of the server 20 checks to see whether the authentication data on the optical disc 2 are received from the user terminal 30. Upon receipt of the authentication data from the user terminal 30, the judging unit 25 goes to step S74. If the authentication data are not judged received in step S73, the connection is severed in step S80.

In step S74, the server 20 transmits the download start command to the user terminal 30 through the communication unit 26. If the server 20 can send the download start command to the user terminal 30, step S75 is reached; if the server 20 cannot transmit the download start command, then step S80 is reached where the connection is broken. In step S75, the searching/updating unit 24 of the server 20 searches for the content ID data associated with the disc ID data sent from the user terminal 30. The searching/updating unit 24 then searches through the third storage unit 23 for the content data associated with the content ID data. With the applicable content data retrieved from the third storage unit 23, the communication unit 26 transmits the retrieved data to the user terminal 30.

For example, if the disc ID data sent from the user terminal 30 indicate "C0001" as shown in Table 1 above, the content data associated with the content ID data "ggg," "hhh," "iii," etc., are retrieved and transmitted consecutively to the user terminal 30 through the communication unit 26.

In step S76, the browser on the user terminal 30 determines whether the download start command is received from the server 20. If the download start command is judged received, step S77 is reached in which the browser starts downloading the content data. Specifically, the content data transferred from the server 20 are recorded to the storage medium 53. If the download start command is not judged received, then the browser reaches step S81 to break the connection.

In step S78, the browser checks to see if download of the content data has come to an end. When the download is judged terminated, step S79 is reached. If the download has yet to be completed, step S67 is reached again.

When download of the content data is terminated, step S79 is reached in which the content data downloaded onto the storage medium 53 are recorded to the optical disc 2. Specifically, the browser outputs the downloaded content data to the codec 35. The codec 35 modulates the input content data from the system controller 37 by a predetermined modulation method and supplements the data with error-correcting code before outputting the resulting data to the recording processing unit 36. The recording processing unit 36 carries out necessary recording-related processes such as binarization preparatory to recording the content data to the optical disc 2. The sled motor driving unit 40 moves the optical pickup 32 to the recording area 4 on the optical disc 2. The laser driving unit 42 causes the semiconductor laser to emit a high-power light beam to record the content data. On the optical disc 2, the content data are recorded to the recording area 4.

In the case above, authentication of the optical disc 2 was performed by the user terminal 30. This alleviates the work load on the server 20.

In the examples above, content data made up of a plurality of data items were shown downloaded collectively to be recorded onto the optical disc 2. However, this is not limitative of the invention. Alternatively, the user D may selectively download any of a plurality of content data items that are made available, as described below.

Figure 10:
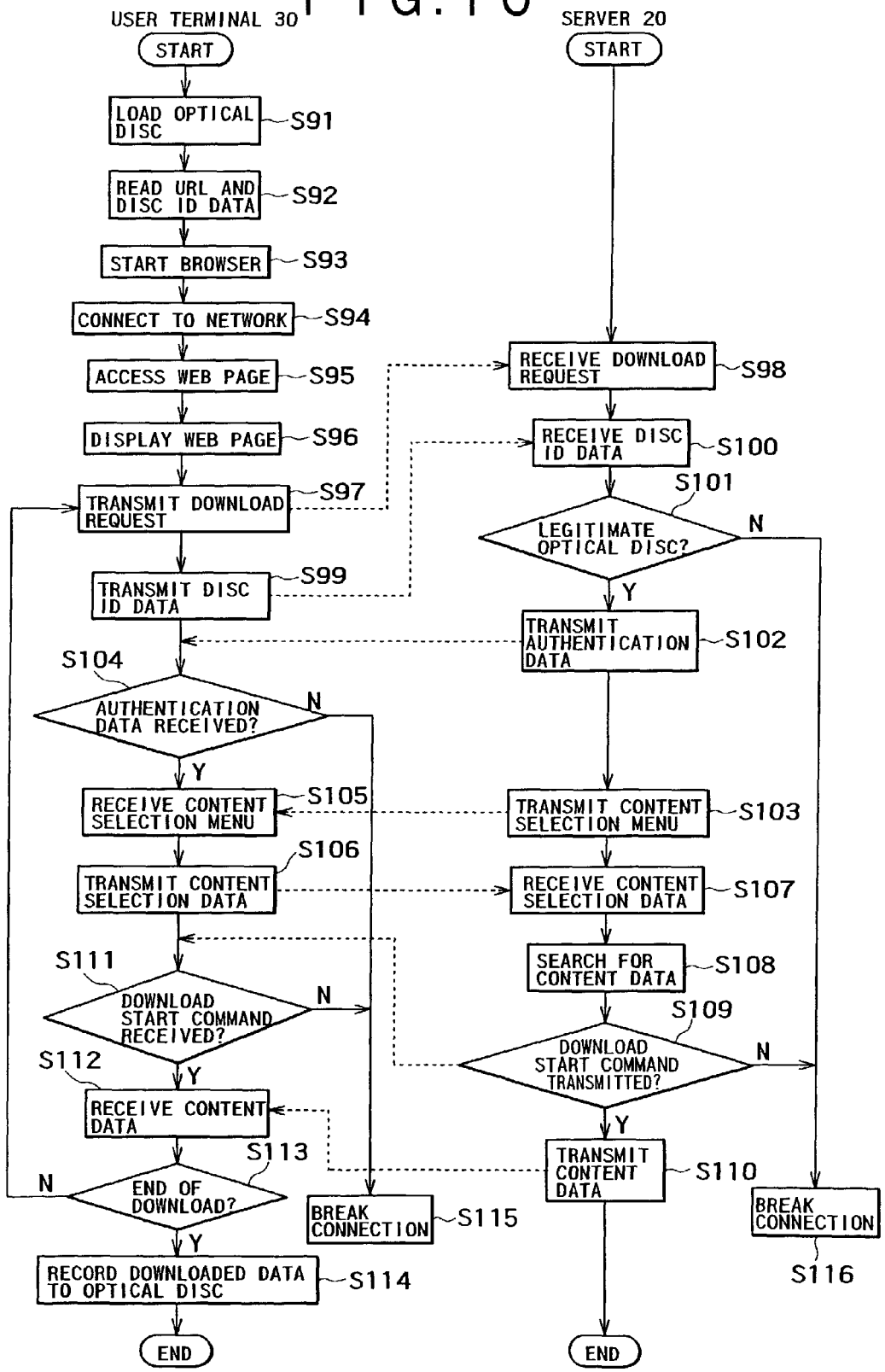
FIG. 10 is a flowchart of steps in which content data to be downloaded are selected through the user terminal.

In step S91 of FIG. 10, the user D loads the optical disc 2 of the package medium M onto the disc table of the spindle motor 31. On detecting the optical disc 2 mounted on the disc table, the system controller 37 goes to step S92. In step S92, the system controller 37 starts reading data (i.e., URL and disc ID data) from the innermost side of the disc. In step S93, the system controller 37 starts the application program making up the browser from the memory 51 to gain access to the web page.

In step S94, the system controller 37 connects to a network such as the Internet through a dial-up connection or similar arrangements. In step S95, the browser causes the communication unit 47 to access the web page set up by the sever 20 and designated by the URL read from the optical disc 2. In step S96, the browser downloads from the server 20 the image data and other data constituting the accessed web page, and causes the display unit 48 to display the web page.

In step S97, the user D agrees to the service use contract displayed on the display unit 48 and clicks on the download button, by use of the mouse or the like constituting part of the operation unit 50. In turn, the browser causes the communication unit 47 to transmit to the server 20 a download request for downloading content data. In step S98, the server 20 receives through the communication unit 26 the download request sent from the user terminal 30.

In step S99, the browser on the user terminal 30 causes the communication unit 47 to transmit to the server 20 the disc ID data retrieved from the optical disc 2 loaded onto the disc table. In step S100, the server 20 receives through the communication unit 47 the disc ID data sent from the user terminal 30.

In step S101, the judging unit 25 of the server 20 determines whether the optical disc 2 to which the user D is about to record content data is a legitimate disc. More specifically, the judging unit 25 checks to see whether the disc ID data sent from the user terminal 30 are registered in the content database set up in the first storage unit 21 as shown in Table 1 above. If in step S101 the judging unit 25 judges the optical disc 2 to be legitimate, the server 20 goes to step S102 and transmits authentication data to the user terminal 30 through the communication unit 26. If in step S101 the judging unit 25 finds that the optical disc 2 is not a legitimate one, then the server 20 transmits rejection data to the user terminal 30 through the communication unit 26 and reaches step S116 to break the connection.

In step S103, the server 20 retrieves from the third storage unit 23 the image data constituting a content selection menu screen from which the user D may download content data selectively. The retrieved image data are transmitted to the user terminal 30 through the communication unit 26. In step S104, the browser on the user terminal 30 judges whether authentication data from the server 20 are received by the communication unit 47. If the authentication data are judged received, step S105 is reached. If the authentication data are not judged received and rejection data are illustratively received instead, then step S115 is reached in which the connection with the server 20 is broken.

In step S105, the browser on the user terminal 30 causes the communication unit 47 to receive the image data and other data constituting the content selection menu screen from which to select content data. With the menu screen data received, the content selection menu screen is displayed on the display unit 48. The displayed screen indicates, as shown in tabular form in Table 1 above, all selectable content data items such as "jjj," "kkk," "lll," etc., associated with the disc ID data which are, say, "D0001."

In step S106, the user D selects desired downloadable content data items from the content selection menu screen on the display unit 48, by use of the mouse or the like constituting part of the operation unit 50. After agreeing to the service use contract displayed on the display unit 48 by operating the mouse, or the like, the user D clicks illustratively on the download button to initiate download. This causes the browser to transmit suitable content selection data designating the selected content data items to the server 20 through the communication unit 47. In step S107, the server 20 receives through the communication unit 26 the content selection data sent from the user terminal 30. In step S108, the searching/updating unit 24 of the server 20 searches through the content management database (Table 1 above) for the content ID data corresponding to the content selection data received. The searching/updating unit 24 then searches through the third storage unit 23 for the content data associated with the content ID data, and extracts the applicable content data. In step S109, the server 20 attempts to transmit the download start command to the user terminal 30 through the communication unit 26. If the server 20 can send the download start command to the user terminal 30, step S110 is reached; if the server cannot transmit the download start command, then step S116 is reached in which the connection is severed. In step S110, the communication unit 26 retrieves the applicable content data from the third storage unit 23 and transmits the retrieved data to the user terminal 30.

For example, if the content data items selected by the user D are "jjj," "kkk," and "lll," as shown in Table 1 above, the searching/updating unit 24 transmits these content data items consecutively to the user terminal 30 through the communication unit 26.

In step S111, the browser on the user terminal 30 determines whether the download start command is received from the server 20. If the download start command is judged received, then step S112 is reached in which the browser starts downloading the content data. Specifically, the content data transferred from the server 20 are recorded to the storage medium 53. If the download start command is not judged received, then the browser reaches step S15 to break the connection.

In step S113, the browser checks to see if download of the content data has come to an end. When the download is judged terminated, step S114 is reached. If the download has yet to be completed, step S97 is reached again.

When download of the content data is terminated, step S114 is reached in which the content data downloaded onto the storage medium 53 are recorded to the optical disc 2. Specifically, the browser outputs the downloaded content data to the codec 35. The codec 35 modulates the input content data from the system controller 37 by a predetermined modulation method and supplements the data with error-correcting code before outputting the resulting data to the recording processing unit 36. The recording processing unit 36 carries out necessary recording-related processes such as binarization preparatory to recording the content data to the optical disc 2. The sled motor driving unit 40 moves the optical pickup 32 to the recording area 4 on the optical disc 2. The laser driving unit 42 causes the semiconductor laser to emit a high-power light beam to record the content data. On the optical disc 2, the content data are recorded to the recording area 4.

In the example described above, the user D may selectively download desired content data items and record them to the optical disc 2. Authentication of the optical disc 2 was shown performed by the server 20 in the case above. However, this is not limitative of the invention. Authentication of the disc may alternatively be carried out by the user terminal 30, as shown in FIGS. 8 and 9.

The optical disc 2 may have a plurality of disc ID data items recorded thereon in that case, content data items that are selected regardless of the genre, such as "PPP," "QQQ," "RRR," etc., in Table 1 above, may be arranged to be downloaded.

In the examples above, the user D was shown selectively downloading desired content data. In another variation of the invention, restrictions may be imposed on the period during which content data may be downloaded as well as on the number of times content data may be downloaded, as described below.

Figure 11:
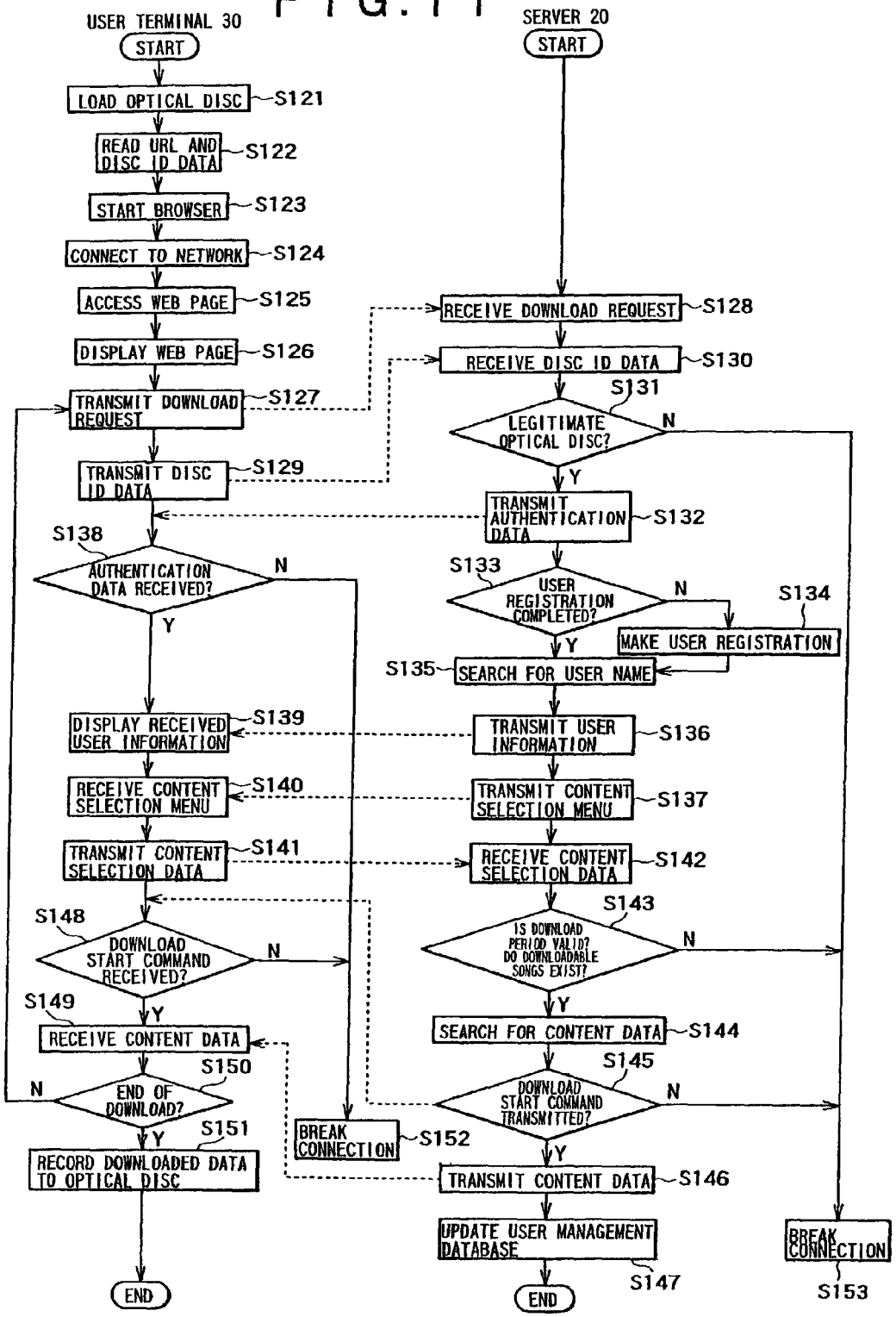
FIG. 11 is a flowchart of steps in which restriction to record on an optical disc is imposed on the period during which content data is downloaded and/or on the number of time content data is downloaded.

In step S121 of FIG. 11, the user D loads the optical disc 2 of the package medium M onto the disc table of the spindle motor 31. On detecting the optical disc 2 mounted on the disc table, the system controller 37 goes to step S122. In step S122, the system controller 37 starts reading data (i.e., URL and disc ID data) from the innermost side of the disc. In step S123, the system controller 37 starts the application program making up the browser from the memory 51 to gain access to the web page.

In step S124, the system controller 37 connects to a network such as the Internet through a dial-up connection or similar arrangements. In step S125, the browser causes the communication unit 47 to access the web page set up by the sever 20 and designated by the URL read from the optical disc 2. In step S126, the browser downloads from the server 20 the image data and other data constituting the accessed web page, and causes the display unit 48 to display the web page.

In step S127, the user D agrees to the service use contract displayed on the display unit 48 and clicks on the download button, by use of the mouse or the like constituting part of the operation unit 50. In turn, the browser causes the communication unit 47 to transmit to the server 20 a download request for downloading content data. In step S128, the server 20 receives through the communication unit 26 the download request sent from the user terminal 30.

In step S129, the browser on the user terminal 30 causes the communication unit 47 to transmit to the server 20 the disc ID data retrieved from the optical disc 2 loaded onto the disc table. In step S130, the server 20 receives through the communication unit 47 the disc ID data sent from the user terminal 30.

In step S131, the judging unit 25 of the server 20 determines whether the optical disc 2 to which the user D is about to record content data is a legitimate disc. More specifically, the judging unit 25 checks to see whether the disc ID data sent from the user terminal 30 are registered in the content database set up in the first storage unit 21 as shown in Table 1 above. If in step S131 the judging unit 25 judges the optical disc 2 to be legitimate, the server 20 goes to step S132 and transmits authentication data to the user terminal 30 through the communication unit 26. If in step S131 the judging unit 25 finds that the optical disc 2 is not a legitimate one, then the server 20 transmits rejection data to the user terminal 30 through the communication unit 26 and reaches step S153 to break the connection.

In step S133, the judging unit 25 of the server 20 then determines whether the user D who has gained access is registered already. More specifically, the judging unit 25 searches through the user management database in the second storage unit 22 to see if the user D in question is already registered therein. If the user D is judged to be registered, the server 20 goes to step 135; if the user D is not judged registered, the server 20 reaches step S134.

In step S134, the server 20 performs a user registration process on the user D in question. Specifically, the server 20 transmits to the user terminal 30 the image data constituting a user registration screen through which user registration is made. On receiving the user registration screen data, the user terminal 30 causes the user registration screen to appear on the display unit 48. The user D enters the user name and other necessary data items into the registration screen by manipulating the operation unit 50. In response to a suitable operation by the user D, the user terminal 30 transmits the input data for user registration to the server 20. The server 20 receives through the communication unit 26 the input data coming from the user terminal 30, and performs a registration process to make necessary entries into the user management database in the second storage unit 22. The user registration process in step S134 is followed by step S135.

In step S135, the searching/updating unit 24 of the server 20 searches through the user management database for information associated with the user name. In step S136, the user information is extracted from the database and transmitted to the user terminal 30 through the communication unit 26. More specifically, the server 20 causes the communication unit 26 to transmit to the user terminal 30 such information as which content data items have so far been downloaded, how many content data items are left downloadable, and for how many days the content data are allowed to be downloaded. In step S137, the server 20 retrieves from the third storage unit 23 the image data constituting a content selection menu screen from which the user D may selectively download content data, and transmits the retrieved data to the user terminal 30 through the communication unit 26.

Meanwhile, in step S138, the browser on the user terminal 30 checks to see if the authentication data from the server 20 have been received by the communication unit 47. If the authentication data are judged received, step S139 is reached. If the authentication data are not judged received and rejection data are illustratively received instead, then step S152 is reached in which the connection with the server 20 is broken.

In step S139, the user terminal 30 receives through the communication unit 47 the user information sent from the server 20, and cause the display unit 48 to display the received information. This allows the user D to know the number of remaining downloadable content data items and the remaining period that allows to download the content data.

In step S140, the browser on the user terminal 30 receives through the communication unit 47 the image data and other data constituting the selection menu screen through which to select content data, and causes the display unit 48 to display the menu screen. The content selection menu screen on the display unit 48 indicates, as shown in tabular form in Table 1 above, all selectable content data items such as "jjj," "kkk," "lll," etc., associated with the disc ID data which are, say, "D0001."

In step S141, the user D selects desired downloadable content data items from the content selection menu screen on the display unit 48, by use of the mouse or the like constituting part of the operation unit 50. After agreeing to the service use contract displayed on the display unit 48 by operating the mouse, or the like, the user D clicks illustratively on the download button to initiate download. This causes the browser to transmit suitable content selection data designating the selected content data items to the server 20 through the communication unit 47. In step S142, the server 20 receives through the communication unit 26 the content selection data sent from the user terminal 30.

In step S 143, the searching/updating unit 24 of the server 20 searches through the user management database in the second storage unit 22 for the status of the user D who sent the selection data, i.e., for the number of remaining downloadable content data items and the remaining period for download in relation to the user D. More specifically, in step S143, the judging unit 25 determines whether the predetermined download period has yet to expire and whether downloadable content data items are still available. If these conditions are met, the server 20 goes to step S144; if the conditions are not satisfied, the server 20 reaches step S153 to break the connection.

In step S144, the searching/updating unit 24 of the server 20 searches through the content management database (Table 1 above) for the content ID data corresponding to the content selection data received. The searching/updating unit 24 then searches through the third storage unit 23 for the content data associated with the content ID data, and extracts the applicable content data. In step S145, the server 20 attempts to transmit the download start command to the user terminal 30 through the communication unit 26. If the server 20 can send the download start command to the user terminal 30, step S146 is reached; if the server cannot transmit the download start command, then step S153 is reached in which the connection is severed. In step S146, the communication unit 26 retrieves the applicable content data from the third storage unit 23 and transmits the retrieved data to the user terminal 30. For example, if the content data items selected by the user D are "jjj," "kkk," and "lll," as shown in Table 1 above, the searching/updating unit 24 transmits these content data items consecutively to the user terminal 30 through the communication unit 26.

In step S147, the searching/updating unit 24 updates the user management database. Specifically, the searching/updating unit 24 increments the download count by the number of downloaded content data items, and decrements the remaining download period by the elapsed time.

In step S148, the browser on the user terminal 30 determines whether the download start command is received from the server 20. If the download start command is judged received, then step S149 is reached in which the browser starts downloading the content data. Specifically, the content data transferred from the server 20 are recorded to the storage medium 53. If the download start command is not judged received, then the browser reaches step S152 to break the connection.

In step S150, the browser checks to see if download of the content data has come to an end. When the download is judged terminated, step S151 is reached. If the download has yet to be completed, step S127 is reached again.

When download of the content data is terminated, step S151 is reached in which the content data downloaded onto the storage medium 53 are recorded to the optical disc 2. Specifically, the browser outputs the downloaded content data to the codec 35. The codec 35 modulates the input content data from the system controller 37 by a predetermined modulation method and supplements the data with error-correcting code before outputting the resulting data to the recording processing unit 36. The recording processing unit 36 carries out necessary recording-related processes such as binarization preparatory to recording the content data to the optical disc 2. The sled motor driving unit 40 moves the optical pickup 32 to the recording area 4 on the optical disc 2. The laser driving unit 42 causes the semiconductor laser to emit a high-power light beam to record the content data. On the optical disc 2, the content data are recorded to the recording area 4.

In the example described above, the download of content data may be restricted by the predetermined allowable period and by the number of downloadable content data items. Although authentication of the optical disc 2 is performed by the server 20 in the case above, this is not limitative of the invention. Authentication of the disc may alternatively be carried out by the user terminal 30, as shown in FIGS. 8 and 9.

The optical disc 2 may have a plurality of disc ID data items recorded thereon. In that case, content data items that are selected regardless of the genre, such as "PPP," "QQQ," "RRR," etc., in Table 1 above, may be arranged to be downloaded.

The optical disc 2 on which content data have been recorded as depicted in FIGS. 7 through 11 may be played back on the user terminal 30 as follows: The play button, part of the operation unit 50, is first pressed as shown in FIG. 6. This causes the optical pickup 32 to access the recording area 4 on the optical disc 2 indicated in FIG. 4. The optical pickup 32 emits a light beam to the optical disc 2, detects a reflected light beam from the disc surface, reads data from the reflected light beam, and outputs the retrieved data to the DSP 33. If the retrieved data are audio data, the DSP 33 subjects the data to such processes as demodulation and error handling before outputting the resulting data to the decompression unit 34. If the input data from the DSP 33 constitute computer program data or data to be processed by a computer, then the codec 35 subjects the data to such processes as demodulation and error handling before outputting the resulting data to the decompression unit 34. The decompression unit 34 decompresses the compressed data upon receipt and outputs the decompressed data to the audio data output unit 46 or the like.

The content distribution system 1 discussed above in detail allows the user D who bought the package medium M containing the blank optical disc 2 at the record shop B to download desired content data without having to settle payments online over the network. The user D thus feels at ease making the necessary payment over the counter. Taking a look at the jackets contained in the package media M at the storefront of the record shop B allows the user D to select a suitable package medium M with the optical disc 2 to which preferred content data may later be downloaded. More specifically, the system 1 enables the user D to produce an optical disc 2 accommodating, say, some of the latest songs, big hits during a specific time period, or other audio data that are associated with special commemorative occasions such as someone's birthday, wedding anniversary, Christmas.

If the same content data are both sold as package media M with optical discs 2 at the record shops B and made downloadable from the server 20 at the same time, modifications can still be made of the downloadable content data so as to avoid conflict between the two markets. For example, the downloadable content data may be seasonally rearranged or otherwise modified, or may be truncated in terms of the number of songs as opposed to the albums sold over the counter. As another alternative, content data may be made downloadable from the server 20 before they are marketed at the record shops B, on condition that the downloadable content data be corrupted intentionally in quality. This is another measure that may be taken to avoid conflict with the sale of the content data over the counter at a later date. In addition, if the user terminal 30 is arranged to read the URL from the optical disc 2 and gain access to the server 20 in a totally automated manner, that will spare the user D the chore of manually entering the URL. Last but not least, when users purchase blank media and record downloaded content data to the physical media, they can satisfy their possessive instinct, i.e., their desire to own tangible entities.

In the series of steps shown in FIGS. 7 through 11, either the server 20 or the user terminal 30 was shown performing the authentication process based on the disc ID data to see whether the optical disc 2 in question is a legitimate one. Alternatively, only the URL (i.e., address information about the web page) alone may be recorded on the optical disc 2 and the authentication process may be omitted. Also in the processes of FIGS. 7 through 11, the user D may be allowed to listen to the selected content data for trial.

The storage media distributed as the package media M are not limited to optical discs 2 only. The media may be magneto-optical discs, IC cards containing a semiconductor memory each, magnetic discs, and others.

Figure 12:
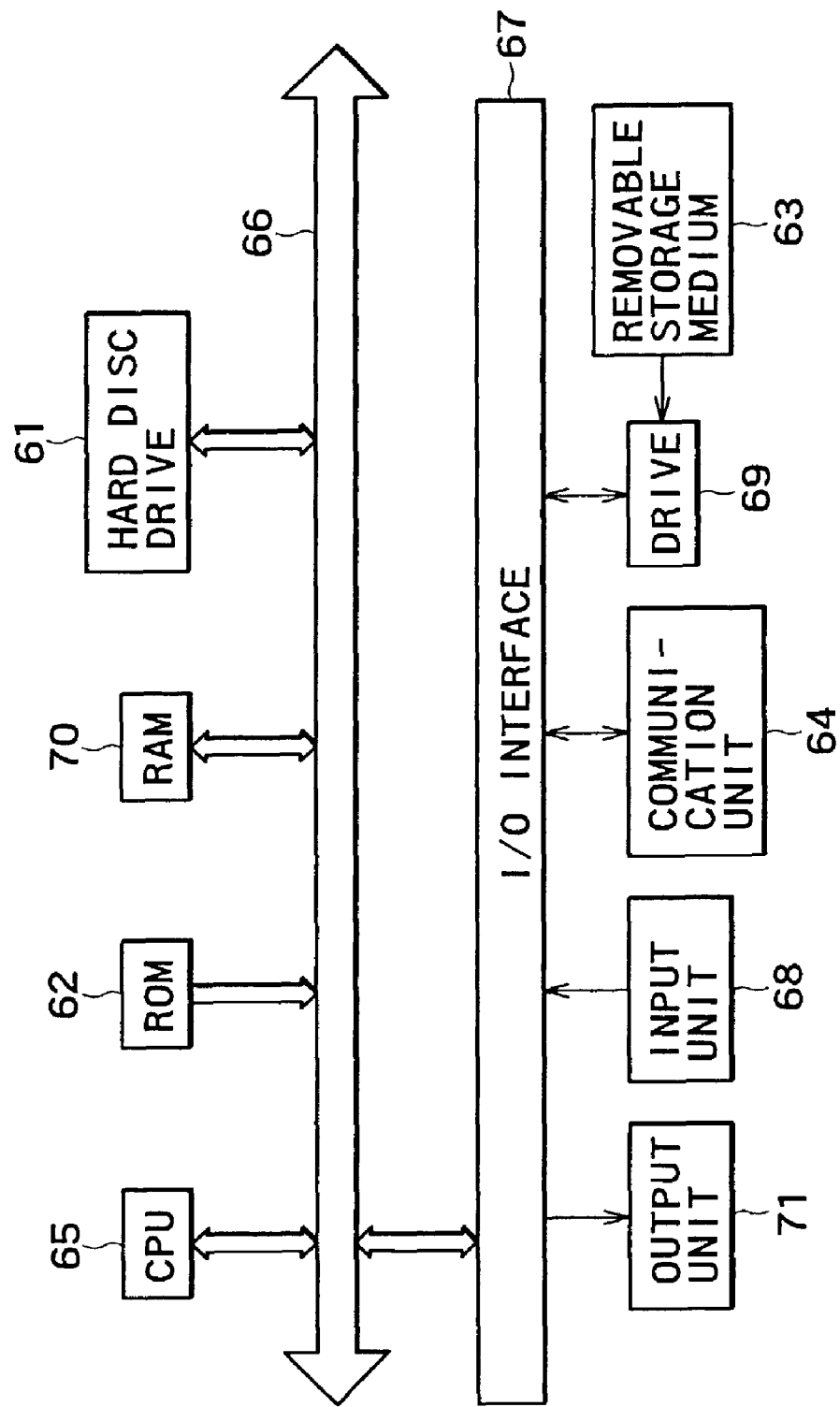
FIG. 12 is a block diagram showing a typical structure of a computer.

The above-described series of steps carried out by the server 20 and other apparatuses may be implemented either by hardware or by software. For the software-based processing to take place, programs constituting the software may be installed into a general-purpose personal computer, a one-chip microcomputer or like equipment. FIG. 12 shows a typical structure of a computer in which the programs implementing the above steps may be installed.

The programs may be recorded beforehand on a storage medium such as a hard disc drive 61 or a ROM (Read-Only Memory) 62 housed in the computer. Alternatively, the programs may be accommodated temporarily or permanently on a removable storage medium 63 such as a flexible magnetic disc, a CD-ROM (Compact Disc Read-Only Memory), an MO (Magneto-Optical) disc, a DVD (Digital Versatile Disc), a magnetic disc, or a semiconductor memory. The removable storage medium 63 of any of these kinds may be marketed as so-called package software.

The programs may be installed from the above-mentioned removable storage medium 63, downloaded in wireless fashion from the download site through digital satellite broadcast links, or downloaded in wired fashion over LAN (Local Area Network) or over the Internet. The programs thus downloaded are received through a communication unit 64 and installed onto the built-in hard disc drive 61.

The computer incorporates a CPU (Central Processing Unit) 65. The CPU 65 is connected via a bus 66 to an I/O interface 67. Commands entered by the user operating an input unit 68 made up of a keyboard or a mouse may be input to the CPU 65 through the I/O interface 67. The commands thus entered prompt the CPU 65 to execute the programs held in the ROM 62.

Alternatively, the programs may be retained beforehand on the hard disc drive 61. The programs may also be installed onto the hard disc drive 61 after they are downloaded via satellite links or over the network and received through the communication unit 64, or may be installed there after being retrieved from the removable storage medium 63 loaded into a drive 69. The programs thus accommodated are loaded into a RAM (Random Access Memory) 70 for execution.

With the necessary programs loaded and executed, the CPU 65 carries out processes as outlined in the above-described flowcharts using the setups or above-described block diagrams. The CPU 65 outputs the results of such processing through the I/O interface 67 to an output unit 71 for visual and/or audio output using LCD and/or speaker arrangements, to the communication unit 64 for transmission to an external device, or to the hard disc 61 for storage.

In this specification, the steps describing the programs to be executed represent not only the processes that are carried out in the depicted sequence (i.e., on a time series basis) but also processes that are conducted parallelly or individually (e.g., in parallel or object-oriented fashion).

The programs may be performed either by a single computer or by a plurality of computers in distributed fashion. Furthermore, the programs may be transferred to a remotely located computer or computers for execution purposes.

While a preferred embodiment of the invention has been described using specific terms, such description is for illustrative purpose only, and it is to be understood that changes and variations may be made without departing from the spirit of scope of the following claims.

What is claimed is:

1. A first communication apparatus comprising:
    storing means separate from an optical disc for storing optical disc identification data for identifying the optical disc and content data in association with the optical disc identification data, the content data comprising audio data, video data and/or game data associated with said optical disc;
    receiving means for receiving the optical disc identification data held on said optical disc, said optical disc identification data being transmitted from a second communication apparatus based on an address retained on said optical disc, wherein the second communication apparatus is at a same location as a location of the optical disc;

judging means for making a judgment whether said optical disc is legitimate based on said optical disc identification data received by said receiving means;

searching means for searching through said storing means for the content data corresponding to said optical disc based on said optical disc identification data;

transmitting means for transmitting said content data to said second communication apparatus in accordance with the judgment by said judging means;

wherein said optical disc identification data is image data;

retrieving means for retrieving information about an address on a network and storage medium identification data for identifying said optical disc, from said optical disc which stores the address information and said storage medium identification data and which has a recording area on which content data comprising audio data, video data and/or game data are to be recorded;

judging means for making a judgment whether said optical disc is legitimate based on said storage medium identification data retrieved by said retrieving means;

recording means which, based on said address information retrieved by said retrieving means, accesses said second communication apparatus which stores the content data comprising audio data, video data and/or game data corresponding to said optical disc, said recording means further recording on said recording area of said optical disc the content data transmitted from said second communication apparatus, wherein the recording means is at a same location as a location of the optical disc;

controlling means for controlling said recording means in accordance with the judgment, wherein said recording means further comprises:

accessing means which, based on said address information retrieved by said retrieving means, accesses said second communication apparatus which stores the content data corresponding to optical disc; and downloading means for recording to said recording area of said optical disc the content data transmitted from said second communication apparatus; and wherein said controlling means inhibits access to said second communication apparatus by said accessing means depending on the judgment by said judging means.

2. A first communication apparatus according to claim 1, wherein said judging means judges whether said optical disc is legitimate based on whether said optical disc identification data received by said receiving means is stored in said storing means.

3. A first communication apparatus according to claim 1, wherein said optical disc identification data is provided corresponding to each content data item recorded on said optical disc.

4. A first communication apparatus according to claim 1, wherein said content data stored in said storing means is kept up to date.

5. A first communication apparatus according to claim 1, wherein said content data stored in said storing means is furnished with supplementary data.

6. A first communication apparatus according to claim 1, wherein said content data stored in said storing means is compressed data.

7. A first communication apparatus according to claim 1, wherein said content data stored in said storing means may be downloaded by said second communication apparatus during a specific time period.

8. A first communication apparatus according to claim 1, wherein said content data stored in said storing means may be downloaded by said second communication apparatus a predetermined number of times.

9. A first communication apparatus according to claim 1, wherein said searching means searches through said storing means for the content data in accordance with selection data transmitted from said second communication apparatus.

10. A first communication apparatus comprising:

a storing unit for storing a plurality of track data items comprising audio data, video data and/or game data corresponding to a distributed disc and disc identification data for identifying a legitimate disc, in association with said plurality of data track items;

a receiving unit for receiving said disc identification data that is held on said disc and that is transmitted from a second communication apparatus at a same location as a location of said disc;

a judging unit for making a judgment whether said disc is a legitimate disc based on said disc identification data received by said receiving unit;

a searching unit for searching through said storing unit for said plurality of track data items corresponding to said disc identification data;

a transmitting unit for transmitting to said second communication apparatus said plurality of track data items retrieved by said searching unit in accordance with the judgment by said judging unit;

a retrieving unit for retrieving information about an address on a network at which a plurality of track data items comprising audio data, video data and/or game data are stored corresponding to said distributed disc, and disc identification data for identifying said disc, from said recording medium which stores the address information and said disc identification data and which has a recording area on which said plurality of track data items comprising audio data, video data and/or game data are to be recorded upon receipt;

a judging unit for making a judgment whether said disc is a legitimate one based on said disc identification data retrieved by said retrieving unit;

an accessing unit which, based on said address information retrieved by said retrieving unit, accesses said second communication apparatus which stores said plurality of track data items comprising audio data, video data and/ or game data;

a recording unit for recording on said recording area of said disc said plurality of track data items transmitted from said second communication apparatus, wherein the recording unit is located at a same location as a location of said disc; and a controller for inhibiting access by said accessing unit depending on the judgment by said judging unit.

* * * * *